(12) United States Patent
Yu et al.

(10) Patent No.: US 10,594,941 B2
(45) Date of Patent: Mar. 17, 2020

(54) METHOD AND DEVICE OF IMAGE PROCESSING AND CAMERA

(71) Applicant: SZ DJI TECHNOLOGY CO., LTD., Shenzhen (CN)

(72) Inventors: Lifu Yu, Shenzhen (CN); Zefei Li, Shenzhen (CN); Zisheng Cao, Shenzhen (CN); Mingyu Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/884,985

(22) Filed: Jan. 31, 2018

(65) Prior Publication Data

US 2018/0160045 A1   Jun. 7, 2018

Related U.S. Application Data

(63) Continuation of application No. PCT/CN2015/085641, filed on Jul. 31, 2015.

(51) Int. Cl.
*H04N 5/225* (2006.01)
*H04N 5/232* (2006.01)
(Continued)

(52) U.S. Cl.
CPC ....... *H04N 5/23267* (2013.01); *G06K 9/3208* (2013.01); *G06T 5/006* (2013.01);
(Continued)

(58) Field of Classification Search
CPC .............................................. G02B 27/0025
See application file for complete search history.

(56) References Cited

U.S. PATENT DOCUMENTS 6,992,700 B1 *  1/2006  Sato ................ G03B 5/00
                                            348/208.11
2002/0122113 A1 *  9/2002  Foote ............. G06T 3/4038
                                            348/48
(Continued)

FOREIGN PATENT DOCUMENTS

CN       101390383 A      3/2009
CN       102082910 A      6/2011
(Continued)

OTHER PUBLICATIONS

The World Intellectual Property Organization (WIPO) International Search Report and Written Opinion for PCT/CN2015/085641 dated May 4, 2016 9 Pages.

*Primary Examiner* — Twyler L Haskins
*Assistant Examiner* — Dwight Alex C Tejano
(74) *Attorney, Agent, or Firm* — Anova Law Group, PLLC

(57) ABSTRACT

An image processing method includes obtaining an acquired image captured by an image acquisition device and obtaining vibration information associated with the acquired image and generated while the image acquisition device capturing the acquired image. The vibration information includes an angle of vibration. The method further includes performing a distortion correction to the acquired image to obtain a distortion-corrected image based upon the vibration information and a preset distortion correction parameter, and determining a target image from the distortion-corrected image based upon the vibration information.

16 Claims, 15 Drawing Sheets

(51) Int. Cl.
*G06T 5/00* (2006.01)
*G06K 9/32* (2006.01)

(52) U.S. Cl.
CPC ..... *H04N 5/23238* (2013.01); *H04N 5/23254* (2013.01); *H04N 5/23258* (2013.01); *G06K 9/3275* (2013.01); *H04N 5/225* (2013.01)

(56) References Cited

U.S. PATENT DOCUMENTS

| | | | | |
|---|---|---|---|---|
| 2003/0103063 | A1* | 6/2003 | Mojaver | G06T 3/00 345/647 |
| 2004/0183898 | A1* | 9/2004 | Endo | H04N 5/23238 348/36 |
| 2004/0207733 | A1* | 10/2004 | Nose | G06T 3/0018 348/222.1 |
| 2005/0195295 | A1* | 9/2005 | Kawai | H04N 5/2254 348/239 |
| 2005/0196068 | A1* | 9/2005 | Kawai | H04N 5/2254 382/276 |
| 2010/0007751 | A1* | 1/2010 | Icho | H04N 5/232 348/222.1 |
| 2010/0033584 | A1* | 2/2010 | Watanabe | G06T 3/0062 348/208.13 |
| 2011/0043667 | A1* | 2/2011 | Kotani | H04N 5/23216 348/241 |
| 2011/0141298 | A1* | 6/2011 | Nishiyama | G03B 35/00 348/208.99 |
| 2012/0281146 | A1* | 11/2012 | Yamada | H04N 5/23254 348/607 |
| 2014/0307111 | A1* | 10/2014 | Nishigori | H04N 5/23267 348/208.4 |
| 2015/0070519 | A1* | 3/2015 | Motoki | G03B 5/00 348/208.6 |

FOREIGN PATENT DOCUMENTS

| | | |
|---|---|---|
| CN | 102611849 A | 7/2012 |
| CN | 102714696 A | 10/2012 |
| CN | 103414844 A | 11/2013 |
| CN | 103929635 A | 7/2014 |
| CN | 104345516 A | 2/2015 |
| CN | 104574567 A | 4/2015 |
| JP | 2008020716 A | 1/2008 |
| JP | 2012252213 A2 | 12/2012 |
| WO | 2015093083 A1 | 6/2015 |

* cited by examiner

METHOD AND DEVICE OF IMAGE PROCESSING AND CAMERA

CROSS-REFERENCE TO RELATED APPLICATION

This application is a continuation application of International Application No. PCT/CN2015/085641, filed on Jul. 31, 2015, the entire contents of which are incorporated herein by reference.

TECHNICAL FIELD

The disclosure relates to image processing technology, and more particularly to a method and device of image processing and a camera.

BACKGROUND OF THE DISCLOSURE

Cameras convert optical image signals into electrical signals for subsequent transmission and storage. A lens is a key component of a camera. Lenses can include a standard lens and a wide-angle lens in terms of angle of view. An angle of view of a wide-angle lens can be more than 90 degrees. A fisheye lens can even have an angle of view of approximately 180 degrees, making it possible to capture a wide angular extent of a scene.

However, jello effect and ripple-like effect can occur in captured images if the camera is subjected to vibrations in capturing images, which severely affect a quality of the images.

In prior art, an anti-vibration can be effected by a mechanical structure. For instance, a physical gimbal can be used where an anti-vibration is effected with a three-axis motion compensation. However, a physical gimbal can be costly and inconvenient to use (e.g., a user has to carry it as an extra load).

SUMMARY OF THE DISCLOSURE

The disclosure provides a method and device of image processing and a camera. With the technical solution of the disclosure, a satisfactory anti-vibration can be effected, and a high-quality image can be obtained.

A first aspect of the disclosure provides a method of image processing. The method can comprise obtaining an acquired image captured by an image acquisition device; obtaining a vibration information associated with the acquired image, which vibration information being generated as the image acquisition device capturing the acquired image, the vibration information comprising an angle of vibration; and determining a target image from the acquired image based upon the vibration information.

A second aspect of the disclosure provides a method of image processing. The method can comprise obtaining an acquired image captured by an image acquisition device; obtaining a vibration information associated with the acquired image, which vibration information being generated as the image acquisition device capturing the acquired image, the vibration information comprising an angle of vibration; performing a distortion correction to the acquired image based upon the vibration information and a preset distortion correction parameter; and determining a target image from the distortion-corrected image based upon the vibration information.

A third aspect of the disclosure provides device of image processing. The device can comprise an image obtaining module configured to obtain an acquired image captured by an image acquisition device; a vibration obtaining module configured to obtain a vibration information associated with the acquired image, which vibration information being generated as the image acquisition device capturing the acquired image, the vibration information comprising an angle of vibration; and a processing module configured to determine a target image from the acquired image based upon the vibration information.

A fourth aspect of the disclosure provides a camera as an example image acquisition device. The camera can comprise a lens; an image sensor configured to acquire an image data through the lens; and an image processor connected to the image sensor. The image processor can be configured to obtain a vibration information associated with the acquired image, which vibration information being generated as the image acquisition device capturing the acquired image, the vibration information comprising an angle of vibration, and determine a target image from the acquired image based upon the vibration information. The vibration information can comprises an angle of vibration.

A fifth aspect of the disclosure provides a device of image processing. The device can comprise a first obtaining module configured to obtain an acquired image captured by an image acquisition device; a second obtaining module configured to obtain a vibration information associated with the acquired image, which vibration information being generated as the image acquisition device capturing the acquired image, the vibration information comprising an angle of vibration; a first processing module configured to perform a distortion correction to the acquired image based upon the vibration information and a preset distortion correction parameter; and a second processing module configured to determine a target image from the distortion-corrected image based upon the vibration information.

A sixth aspect of the disclosure provides a camera as an example image acquisition device. The camera can comprise a lens; an image sensor configured to acquire an image data through the lens; and an image processor connected to the image sensor. The image processor can be configured to obtain an acquired image from the image data acquired by the image sensor; obtain a vibration information associated with the acquired image, which vibration information being generated as the image acquisition device capturing the acquired image, the vibration information comprising an angle of vibration; perform a distortion correction to the acquired image based upon the vibration information and a preset distortion correction parameter; and determine a target image from the distortion-corrected image based upon the vibration information.

A seventh aspect of the disclosure provides an aerial vehicle for aerial photography. The aerial vehicle can comprise a body and a camera mounted on the body. The camera can comprise a camera of the fourth aspect or a camera of the sixth aspect.

A eighth aspect of the disclosure provides an aerial vehicle for aerial photography. The aerial vehicle can comprise a body, an image acquisition device mounted on the body and a processor in data communication with the image acquisition device. The processor can comprises a device of image processing of the third aspect or a device of image processing of the fifth aspect.

With embodiments of the disclosure, an image processing can be performed based upon a vibration information. An anti-vibration can be effected in the process of image processing without using an anti-vibration hardware device (e.g., a gimbal). A cost can be reduced, and a user experience can be improved.

DETAILED DESCRIPTION OF THE DISCLOSURE

A better understanding of the disclosure will be obtained by reference to the following detailed description that sets forth illustrative embodiments with reference to the drawings. It will be apparent that, the embodiments described herein are merely provided by way of example. Those skilled in the art can conceive various embodiments in light of those disclosed herein without inventive efforts, and all these embodiments are within the scope of the disclosure.

Figure 1:
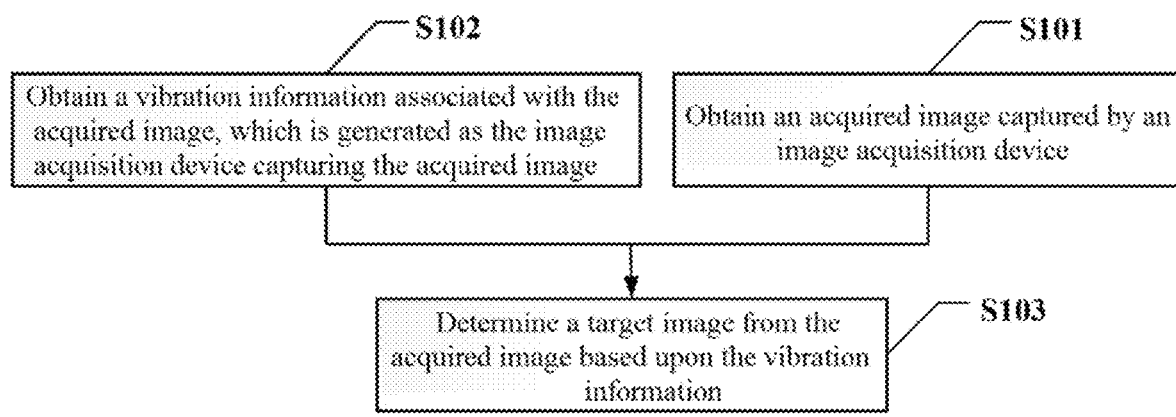
FIG. 1 shows a flowchart of a method of image processing in accordance with embodiments of the disclosure.

FIG. 1 shows a flowchart of a method of image processing in accordance with embodiments of the disclosure. The method of image processing in accordance with embodiments of the disclosure can be applied to various image acquisition devices and can be implemented by one or more image processors. In some embodiments, the method can comprise steps S101 to S103.

In step S101, an acquired image captured by an image acquisition device can be obtained.

The image acquisition device can include an intelligent image capturing device capable of capturing images, such as a still camera or a video camera. An acquired image can be obtained from the image acquisition device through a data communication therewith. In some instances, the image acquisition device can comprise a wide-angle lens such as a fisheye lens, and the acquired image can be a fisheye image.

In step S102, a vibration information associated with the acquired image, which vibration information is generated as the image acquisition device capturing the acquired image, can be obtained. In some instances, the vibration information can comprise an angle of vibration.

In some embodiments, the image acquisition device can operate in a video capture mode or in a continuous capture mode. The vibration information can be an angular change in a position of the image acquisition device in capturing a current image relative to a position of the image acquisition device in capturing a previous image. Alternatively, the vibration information can be an angular change in a position of the image acquisition device in capturing a current image relative to a reference position. The reference position can be an initial position of the image acquisition device where it starts to capture images. In some instances, the vibration information can include angular change information of the image acquisition device in three directions. For instance, the vibration information can comprise angular change information in a pitch angle, a yaw angle and a roll angle.

In some instances, an angular sensor (e.g., a gyroscope) can be provided at the image acquisition device to detect the vibration information of the image acquisition device. A raw data can be obtained directly from the angular sensor, and the angular change can be calculated from the raw data. Optionally, the angular change can be obtained directly from the angular sensor provided that the angular sensor is provided with a calculation capability.

In some embodiments, the angular sensor can be directly provided on the image acquisition device through a fixed connection. Alternatively, the angular sensor can be fixedly connected to various external devices to which the image acquisition device is rigidly connected. For instance, the angular sensor can be mounted on an aerial vehicle which carries the image acquisition device. The angular sensor fixed connected to the external device can detect the vibration information of the image acquisition device as a vibration of the external devices directly leads to a vibration of the image acquisition device. It will be appreciated that, the angular sensor may not accurately detect the vibration information of the image acquisition device if the image acquisition device is flexibly connected to the external device. In this situation, the angular sensor may not be provided on the external device.

In step S103, a target image can be determined from the acquired image based upon the vibration information.

In some instances, the process in step S103 can comprise performing, based upon the vibration information, a coordinate transformation to obtain a coordinate mapping from a plane coordinate system in which the acquired image is positioned and a target coordinate system, and subsequently determining a texture information of respective pixel (e.g., a grayscale value corresponding to the pixel) in the acquired image to obtain a texture mapping. A conversion from the acquired image to a target image can be performed based upon the obtained coordinate mapping, the texture mapping and a preset distortion correction parameter, such that a distortion-corrected target image can be obtained.

In some instances, the process in step S103 can comprise performing, based upon the vibration information, a coordinate transformation to obtain a coordinate mapping from a plane coordinate system in which the acquired image is positioned and a target coordinate system, and subsequently determining a texture information of respective pixel (e.g., a grayscale value corresponding to the pixel) in the acquired image to obtain a texture mapping. A conversion from the acquired image to an initial image can be performed based upon the obtained coordinate mapping, the texture mapping and a preset distortion correction parameter, such that a distortion-corrected image can be obtained. Subsequently, a vibration compensation can be performed based upon the vibration information and a preset angle of view, such that a distortion-corrected target image can be obtained from the distortion-corrected image.

In some instances, the vibration compensation can comprise determining an initial region in the distortion-corrected image based upon the preset angle of view, and performing a compensation to the initial region based upon the vibration information to obtain a target region. An image covered by the target region can be the target image. In some embodiments of the disclosure, the preset angle of view can be smaller than an angle of view of the image acquisition device capturing the acquired image. In some instances, the preset angle of view can be an angle of view of a standard image, while the acquired image can have an angle of view of a fisheye image. Optionally, the acquired image can have a standard angle of view, while the preset angle of view can be smaller than the standard angle of view.

For instance, in performing the compensation, if a pitch angle information in the vibration information indicates that the image acquisition device rotates downwardly by a first angle, then the initial region can be moved upwardly by the first angle. For instance, in performing the compensation, if a yaw angle information in the vibration information indicates that the image acquisition device rotates to the left by a second angle, then the initial region can be moved to the right by the second angle. In this way, the vibration compensation can be effected.

In embodiments of the disclosure, an image processing can be performed based upon a vibration information. An anti-vibration can be effected in the process of image processing without using an anti-vibration hardware device (e.g., a gimbal). A cost can be reduced, and a user experience can be improved.

Figure 2:
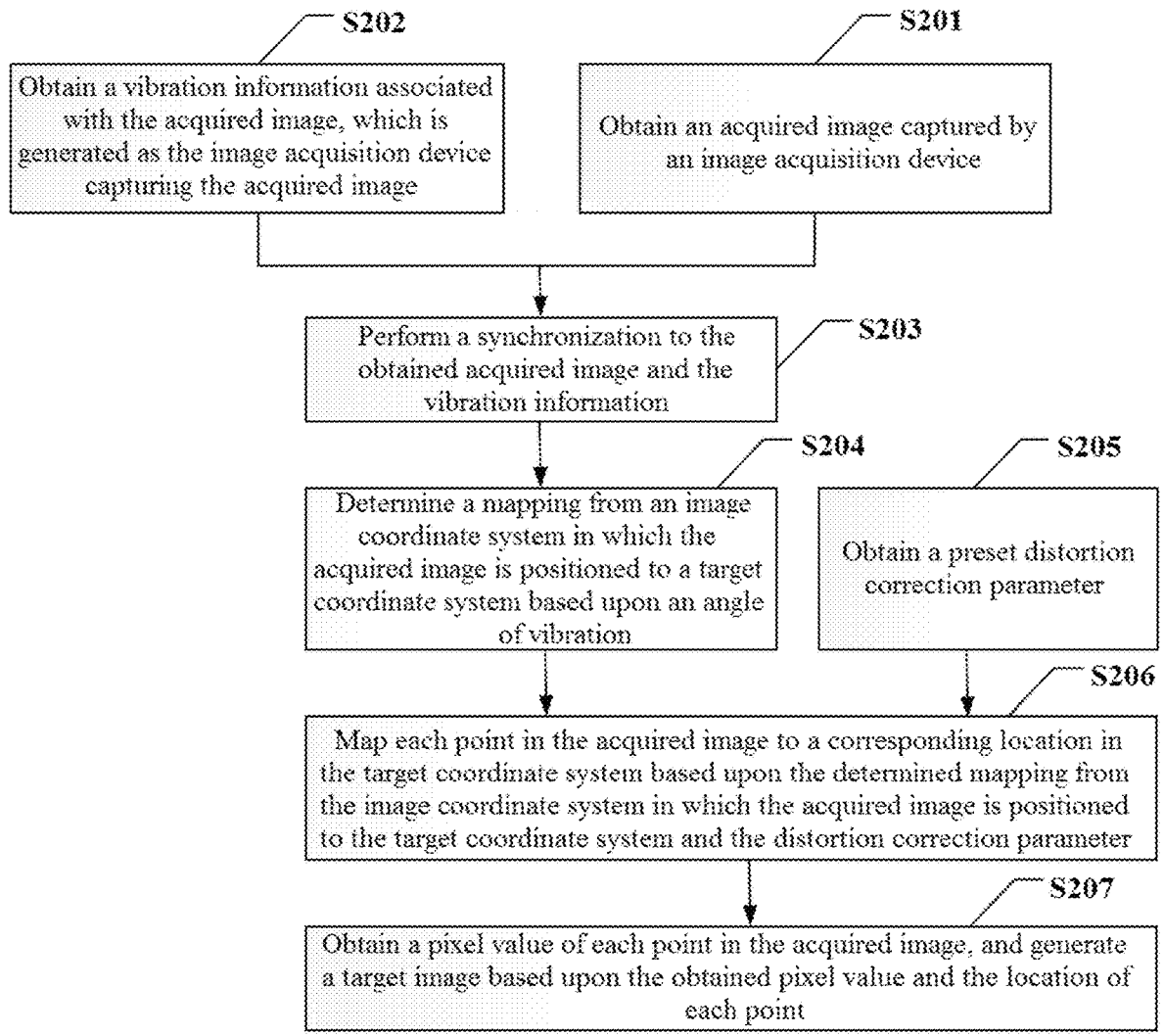
FIG. 2 shows a flowchart of a method of image processing in accordance with another embodiment of the disclosure.

FIG. 2 shows a flowchart of a method of image processing in accordance with another embodiment of the disclosure. The method of image processing in accordance with embodiments of the disclosure can be applied to various image acquisition devices, and can be implemented by one or more image processors. In some embodiments, the method can comprise steps S201 to S207.

In step S201, an acquired image captured by an image acquisition device can be obtained.

The acquired image can be captured using various cameras. In some embodiments, the acquired image can be a wide-angle image, from which a target image having an angle of view smaller than that of the wide-angle image can be determined.

In step S202, a vibration information associated with the acquired image, which is generated as the image acquisition device capturing the acquired image, can be obtained. In some instances, the vibration information can comprise an angle of vibration.

In some instances, the vibration information can be an angular change in a position of the image acquisition device in capturing the acquired image relative to a position of the image acquisition device in capturing a previously acquired image. Optionally, the vibration information can be an angular change in a position of the image acquisition device in capturing the acquired image relative to a reference position. The vibration information can comprise a pitch angle, a yaw angle and/or a roll angle.

The vibration information can be collected by a sensor (e.g., a gyroscope) provided at the image acquisition device. The vibration information can subsequently be used in a plane coordinate mapping processing and a vibration compensation to determine a target region. The vibration information can comprise an angle information in three dimensions, as discussed hereinabove. In some instances, the vibration information can be calculated from an angular acceleration measured by the gyroscope.

In step S203, a synchronization can be performed to the obtained acquired image and the vibration information.

The synchronization can be performed to align the data measured by the sensor (e.g., the gyroscope) with the acquired image captured by a camera in timeline, such that the vibration information is associated with the obtained acquired image.

In some instances, a capture time at which the acquired image being captured can be obtained, and a vibration data measured by the sensor (e.g., the gyroscope) at the capture time can be obtained. The vibration information of a currently acquired image can be obtained based upon a vibration data at a capture time the currently acquired image being captured and a vibration data at a time a previously acquired image being captured. Accuracy of the vibration information of the currently acquired image may be ensured based upon the capture time of the currently acquired image and time points at which the vibration data of the currently acquired image and the previously acquired image being measured, thereby reducing or avoiding errors in subsequent processing.

Once the synchronization is successful, a trigger information can be provided to trigger a process of determining the target image from the acquired image. In some instance, the step S204 can be performed.

In step S204, a mapping from an image coordinate system in which the acquired image is positioned and a target coordinate system can be determined based upon the angle of vibration.

In some instances, a coordinate transformation and mapping in step S204 can be effected using a world coordinate system which is fixed. A transformation from the image coordinate system in which the acquired image is positioned to the target coordinate system can be effected by a transformation from the image coordinate system to the world coordinate system, such that the mapping from the image coordinate system in which the acquired image is positioned to the target coordinate system can be indirectly obtained.

In step S205, a preset distortion correction parameter can be obtained.

In step S206, each point in the acquired image can be mapped to a corresponding location in the target coordinate system based upon the determined mapping from the image coordinate system in which the acquired image is positioned to the target coordinate system and the distortion correction parameter.

In step S207, a pixel value of each point in the acquired image can be obtained, and a target image can be generated based upon the obtained pixel value and the location of each point.

It will be appreciated that, the process of mapping each point in the acquired image to the corresponding location in the target coordinate system in step S206 and the process of obtaining the pixel value of each point in the acquired image in step S207 can be performed simultaneously.

Figure 3:
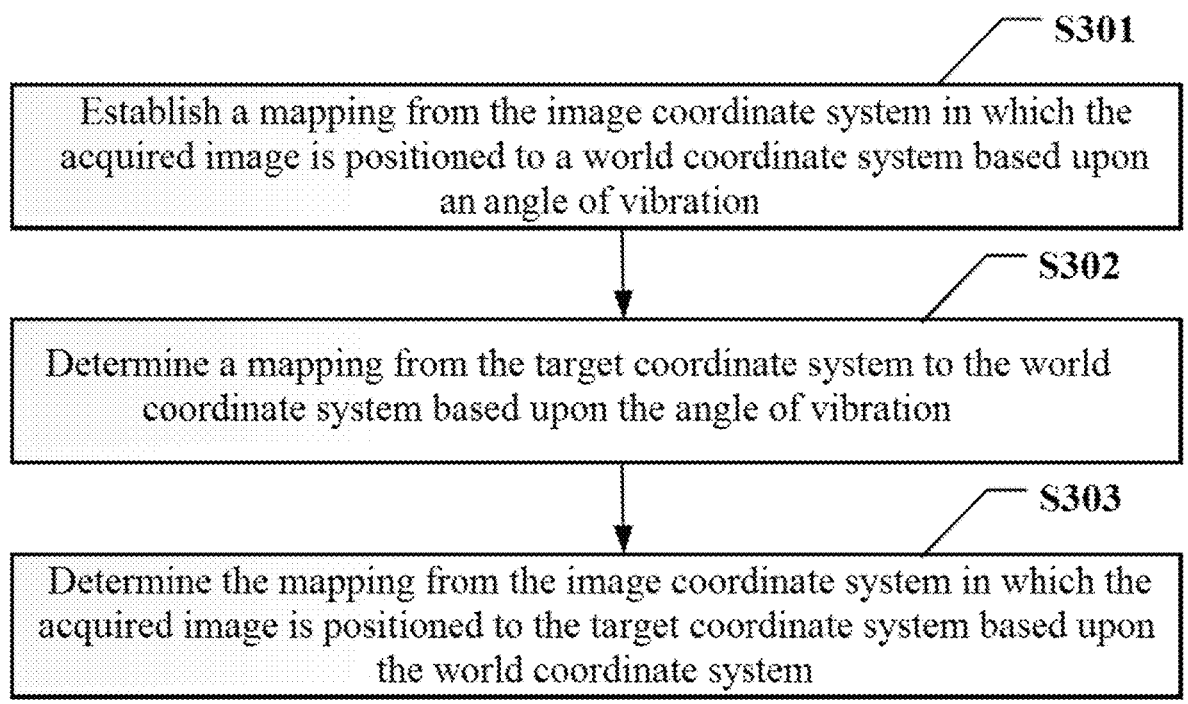
FIG. 3 shows a flowchart of a method for determining a coordinate mapping in accordance with embodiments of the disclosure.

FIG. 3 shows a flowchart of a method for determining a coordinate mapping in accordance with embodiments of the disclosure. In some embodiments, the method can correspond to the step S204 as described hereinabove and comprise steps S301 to S303.

In step S301, a mapping from the image coordinate system in which the acquired image is positioned to a world coordinate system can be established based upon the angle of vibration.

In step S302, a mapping from the target coordinate system to the world coordinate system can be determined based upon the angle of vibration.

In step S303, the mapping from the image coordinate system in which the acquired image is positioned to the target coordinate system can be determined based upon the world coordinate system.

In some embodiments, the process in step S302 can comprise establishing a mapping from the world coordinate system to a preset tangent plane coordinate system based upon the angle of vibration, establishing a mapping from the target coordinate system to the preset tangent plane coordinate system based upon the angle of vibration, and determining the mapping from the target coordinate system to the world coordinate system based upon the preset tangent plane coordinate system. In some instances, the tangent plane coordinate system can be a tangent plane coordinate system in which an arbitrary point on a hemispherical surface having a center coinciding with a center of a lens of the image acquisition device is positioned.

The process of performing the coordinate transformation and the process of performing distortion correction to the acquired image (e.g., a fisheye image) in embodiments of the disclosure will be described.

In a first aspect, let a coordinate system in which a fisheye image (e.g., a distorted image) acquired by an imaging system be an image coordinate system $O_2$-uv, where $O_2$ is a central point of the image, and u, v are a horizontal axis and a vertical axis of the image, respectively.

In a second aspect, let an actual world coordinate system be $O_r$-XYZ. For the sake of a general description, with regard to a fisheye lens having a certain focal length, we can assume an object space of the lens being distributed over a hemispherical surface having a center coinciding with a center $O_r$ of the lens. We can also intuitively assume an image formed in an image space $O_2$-uv being a projection of the object space onto an image sensor along an optical axis.

In a third aspect, let a camera coordinate system be $O_b$-$X_b Y_b Z_b$. The camera coordinate system can be stationery with respect to a camera and a sensor (e.g., a gyroscope). A variation parameter of the camera coordinate system can be obtained using the sensor such as the gyroscope in real-time.

In a fourth aspect, let a coordinate system O1-xy in which a target image (which can be an image having a standard angle of view) is positioned be an image coordinate system of a final output image.

In a fifth aspect, let a tangent plane coordinate system in which a point O on the spherical surface in the second aspect is positioned be O-X'Y'. We can consider the tangent plane coordinate system as an object coordinate system corresponding to the image coordinate system in the fourth aspect.

A hardware configuration of the system can comprise the gyroscope, the camera (e.g., a camera provided with a fisheye lens) and a GPU. A positional relation between the gyroscope and the camera (e.g., a camera provided with a fisheye lens) can be fixed.

In some embodiments, the process of the coordinate transformation and the process of distortion correction in accordance with embodiments of the disclosure can comprise obtaining offline calibration parameters, obtaining input parameters of each frame and outputting a distortion-corrected image in real-time.

In some embodiments, the offline calibration parameters can comprise a coordinate of a center point of the fisheye image, a length and a width of the fisheye image, a length and a width of the standard image, a correction parameter f of the focal length, and an angle of view γ. The input parameters of each frame can comprise an angular change in a position of the camera relative to a position of the camera capturing a previous frame, including a pitch angle θ, a yaw angle φ and a roll angle ρ, a current fisheye image frame, a pitch angular velocity $\dot{\theta}$, a yaw angular velocity $\dot{\varphi}$ and a roll angular velocity $\dot{\rho}$.

In some embodiments, a frame rate of the camera can be set, and the camera can then be directed to operate and acquire fisheye images. In the meanwhile, a parameter representing a positional change of the camera can be obtained from the gyroscope. The data acquired by the gyroscope and the data acquired by the camera can aligned with each other in a timeline through a synchronization process. Subsequently, the acquired data and the offline calibration parameters can be input into a graphics processing unit (GPU) to calculate and output the target image. In some embodiments, the calculation process can comprise transforming a coordinate in the target image into a coordinate under the world coordinate system through the tangent plane coordinate system, and transforming the coordinate under the world coordinate system into a coordinate under the fisheye image coordinate system.

Figure 4:
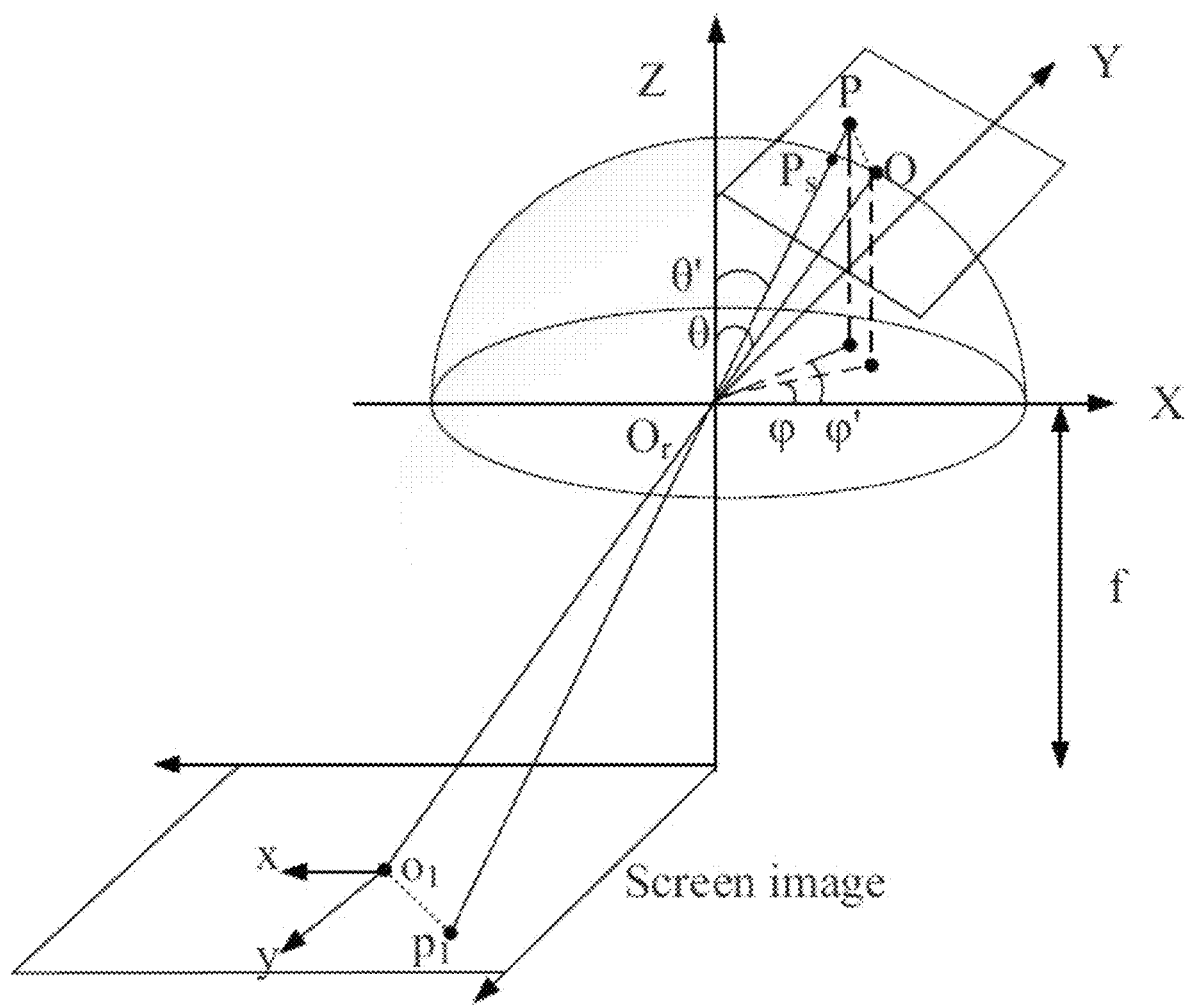
FIG. 4 shows a mapping of a point in a target image coordinate system into a world coordinate system in accordance with embodiments of the disclosure.

As shown in FIG. 4, a coordinate system in which an actual scene corresponding to an original fisheye image is positioned can be Or-XYZ, where the scene can be positioned on the illustrated hemispherical surface. A screen image can be the target image. A point O in a fisheye scene (e.g., the actual scene) corresponding to a central point $O_1$ of the target image can be positioned on the hemispherical surface. A point $P_1$ (x, y) in the target image can correspond to a point P in a tangent plane at the point O, which point O being positioned on the hemispherical surface. A length $O_1P_1$ and a length OP can be proportional to each other, satisfying a geometric transformation. A mapping can be from the point $P_1$ in the screen to the point P in the tangent plane (rather than from the point $P_1$ in the screen to a point $P_s$ on the hemispherical surface). An angle between $O_r P$ and a Z-axis and an angle between $O_r P$ and an X-axis can be θ' and φ', respectively.

A position of the tangent point O can be determined by the angle of view parameters θ and p. A radius of the hemisphere and a radius of the image can both be 1 as a default.

Figure 5:
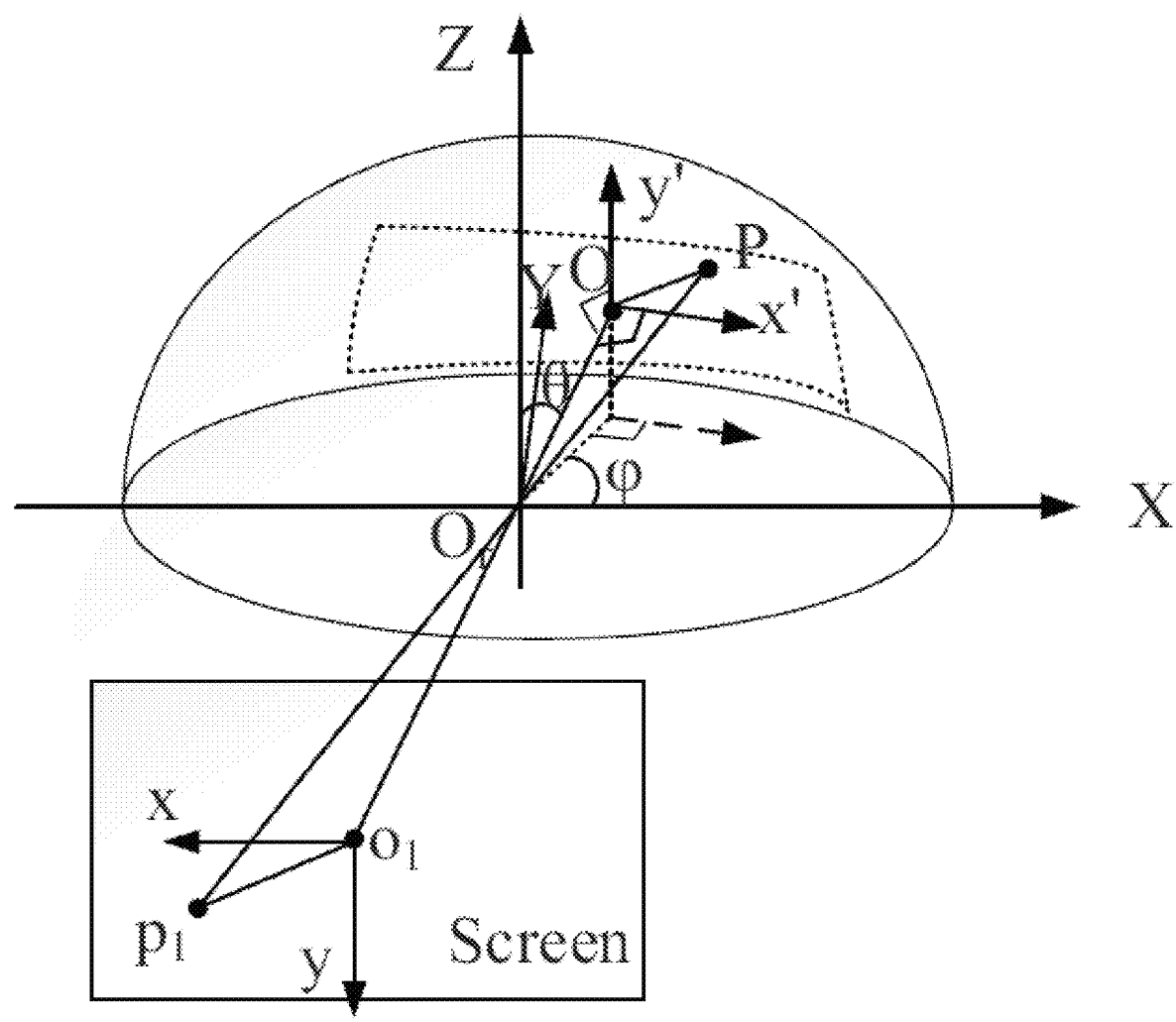
FIG. 5 shows a rotation from a world coordinate system to a tangent plane coordinate system.

In process 1), a tangent plane coordinate system X'OY' can be established at the point O. As shown in FIG. 5, the pitch angle θ can vary along an axis OY' perpendicular to $O_r O$, and the yaw angle φ can vary along an axis OX' perpendicular to $O_r O$. A dashed box shown on the semispherical surface can correspond to edges of the screen.

In process 2), the coordinate system $O_r$-XYZ can be transformed to a coordinate system O-X'Y'Z' through a rotation about the Z-axis by φ degrees, a rotation about the X-axis by θ degrees, and a translation along the $O_r O$ axis from the point $O_r$ to the point O. Let a coordinate of the point P in the O-X'Y'Z' coordinate system be (x', y', 0) and a coordinate of the point P in the $O_r$-XYZ coordinate system be ($x_p$, $y_p$, $z_p$), then we have $$\begin{bmatrix} x_p \\ y_p \\ z_p \\ 1 \end{bmatrix} = \begin{bmatrix} R & t \\ 0 & 1 \end{bmatrix} \begin{bmatrix} x' \\ y' \\ 0 \\ 1 \end{bmatrix} \quad (1)$$

$$\vec{t} = \overrightarrow{O_r O}^T = \begin{bmatrix} \sin\theta\cos\varphi \\ \sin\theta\sin\varphi \\ \cos\theta \end{bmatrix} \quad (2)$$

where $$R = \begin{bmatrix} \sin\varphi & -\cos\varphi & 0 \\ \cos\varphi & \sin\varphi & 0 \\ 0 & 0 & 1 \end{bmatrix} \begin{bmatrix} 1 & 0 & 0 \\ 0 & \cos\theta & -\sin\theta \\ 0 & \sin\theta & \cos\theta \end{bmatrix} \quad (3)$$

Figure 6:
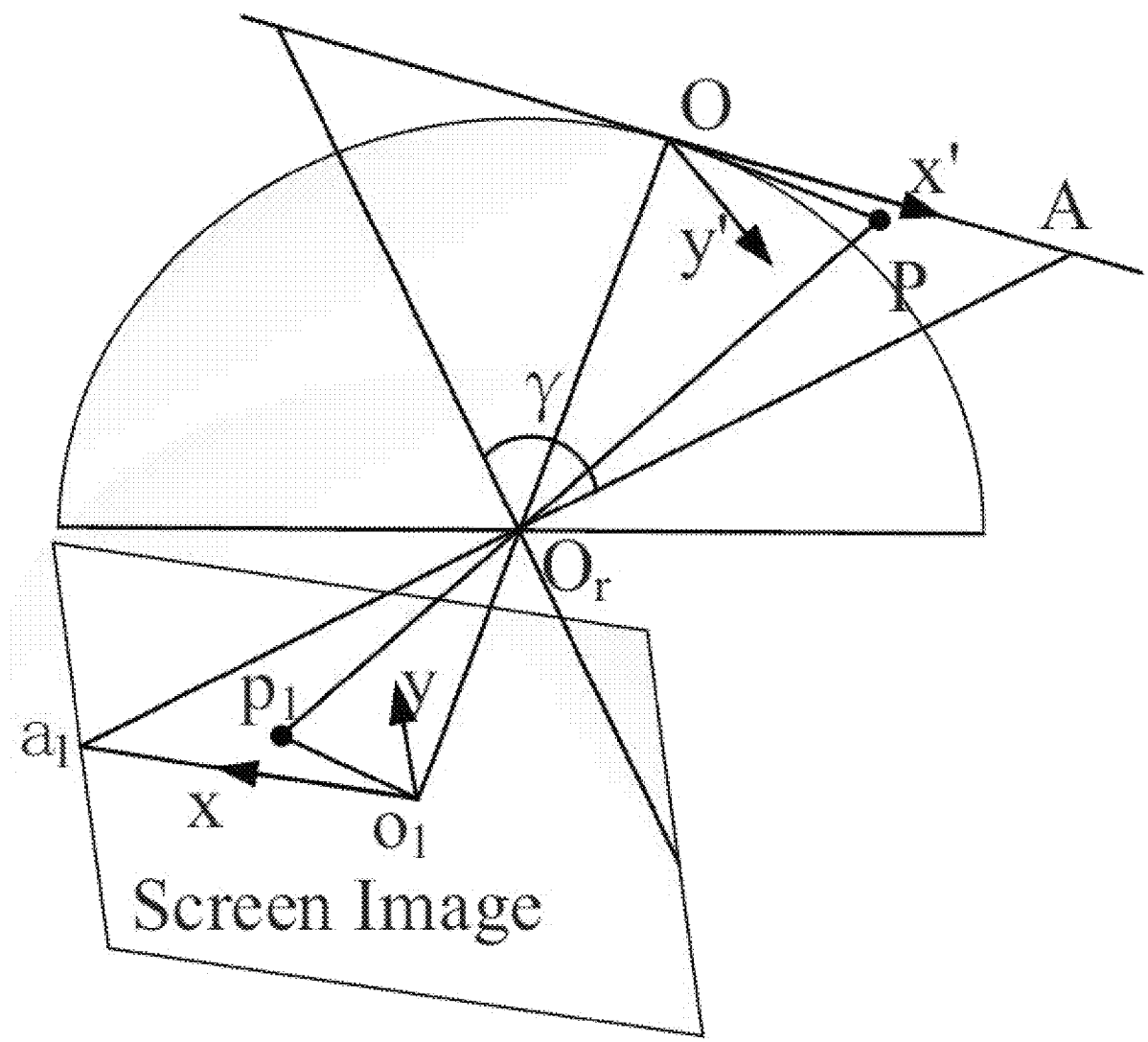
FIG. 6 shows a rotation from a tangent plane coordinate system to a target image coordinate system.

In process 3), the target image coordinate system $xo_1y$ can be transformed to the tangent plane coordinate system X'OY'. In a case where the roll angle $\rho=0$, there is only a translation between the coordinate systems $xo_1y$ and X'OY' without any rotation, and hence:

$$\overrightarrow{OP} = k * \overrightarrow{o_1 p_1} \quad (4)$$

where $\overrightarrow{o_1 p_1}$ is a vector in $xo_1y$, $\overrightarrow{OP}$ is a vector in X'OY', and k is a scaling factor correlated with the input parameter $\gamma$ (angle of view). Referring to FIGS. 5 and 6, we have the following equation along an OX' axis:

$$\overrightarrow{OA} = k * \overrightarrow{o_1 a_1} \quad (5)$$

since $$|O_r O| = 1 \quad (6)$$

then $$|OA| = \tan(\gamma/2) \quad (7)$$

and since $$|o_1 a_1| = 1 \quad (8)$$

then $$k = \tan(\gamma/2) \quad (9)$$

Likewise, the value of the scaling factor k along an OY' axis can have the same value.

In a case where there is an axial rotation between the coordinate systems $xo_1y$ and X'OY' (for example, the roll angle $\rho \neq 0$), the screen coordinates can be rotated, and the equation (4) can be $$\overrightarrow{OP} = k * m * \begin{bmatrix} \cos\rho & -\sin\rho \\ \sin\rho & \cos\rho \end{bmatrix} \overrightarrow{o_1 p_1} \quad (10)$$

where coefficient m guarantees a normalization of the screen coordinates, and $m = 1/\sqrt{2}$ if a width of the screen equals to a height of the screen. Therefore, the following equation can be obtained:

$$\begin{bmatrix} x' \\ y' \end{bmatrix} = \tan(\gamma/2) * 1/\sqrt{2} * \begin{bmatrix} \cos\rho & -\sin\rho \\ \sin\rho & \cos\rho \end{bmatrix} \begin{bmatrix} x \\ y \end{bmatrix} \quad (11)$$

From coordinates (x, y) of an arbitrary point $P_1$ in the target image, coordinates $(x_p, y_p, z_p)$ of a corresponding point P in the world coordinate system can be calculated by combining equations (1) and (11).

In process 4), the following relationships can be obtained from FIG. 4:

$$\theta' = \arctan(\sqrt{x_p^2 + y_p^2}/z_p) \quad (12)$$

$$\varphi' = \arctan(y_p/x_p) \quad (13)$$

A coordinate under the world coordinate system can be transformed into a coordinate in the fisheye image.

Figure 7:
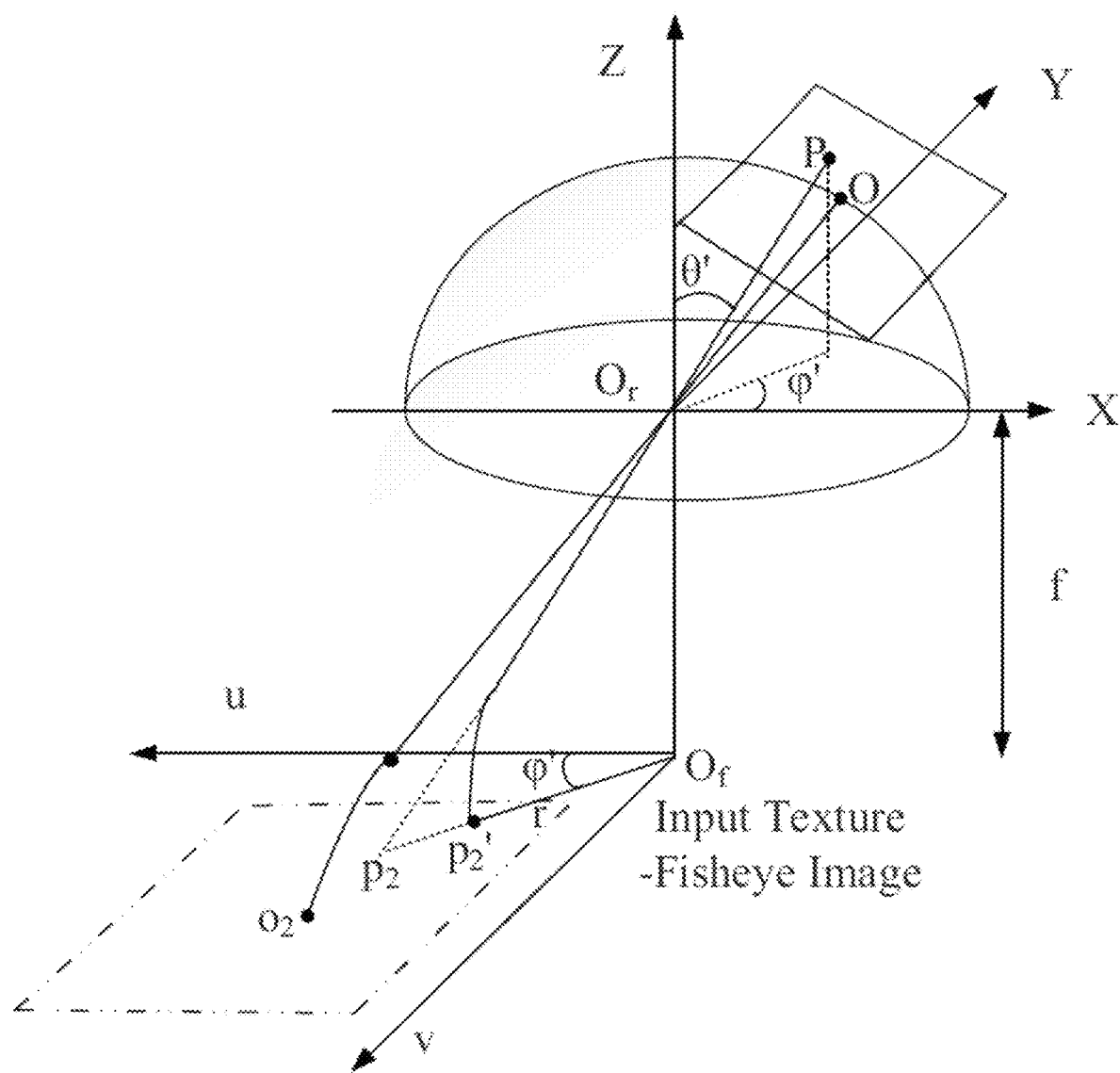
FIG. 7 shows a distortion correction in accordance with embodiments of the disclosure.

As shown in FIG. 7, $P_2$ can be an image point of point P through a pinhole imaging. Due to a fisheye distortion, a real image point $P'_2$ of point P can be positioned in an image before the distortion correction, for example, an input texture-fisheye image. As shown in FIG. 7, $O_2$ can be a image point of O in the fisheye image, and can be a central point of the image.

The correction can be performed using a fisheye lens model $$r = f * \theta' \quad (14)$$

where r is a distance from $P'_2$ to a center $O_f$ of the fisheye image, represented as $O_f P'_2$, where f is a parameter of the focal length. Coordinates (u, v) of $P'_2$ in the fisheye image can be calculated from $\varphi'$ once r is obtained.

$$\begin{bmatrix} u \\ v \end{bmatrix} = r * \begin{bmatrix} \cos\varphi' \\ \sin\varphi' \end{bmatrix} \quad (15)$$

A correspondence between coordinates (x, y) of a point $P_1$ in the target image and coordinates (u, v) of the corresponding point $P'_2$ in the fisheye image can be obtained by combining equations (1), (11), (12), (13), (14) and (15).

A texture information of respective pixel (e.g., a grayscale value corresponding to a respective pixel) in the fisheye image can be obtained, such that a texture information can be provided to respective point in the target image. An interpolation can be required in accessing the pixels as u2, v2 are floating point numbers. The interpolation can be performed by the GPU.

In this way, a mapping from the screen coordinates $P_1$ (x, y) to the spherical coordinate system coordinates P ($x_p$, $y_p$, $z_p$), then to the fisheye image coordinates $P'_2$ (u, v), including a coordinate mapping and a texture mapping, can be implemented.

In the example as described hereinabove, a radial distortion is considered in the fisheye correction using the fisheye lens model shown in equation (14) where only one distortion correction parameter is used:

$$r = f * \theta' \quad (16)$$

In order to increase an accuracy of the correction, the above equation can be modified as:

$$r = \Sigma_{i=0}^{n} k_i * \theta'^{2i+1} \quad (17)$$

where a value of n can be 2. The $\{k_i\}$ can be calibrated in the manufacturing the camera, and provided to the GPU as a uniform variable. The coordinate transformation of each pixel from the fisheye image to the target image and the distortion correction can be performed by the GPU.

In embodiments of the disclosure, an image processing can be performed based upon a vibration information. An anti-vibration can be effected in the process of image processing without using an anti-vibration hardware device (e.g., a gimbal). A cost can be reduced, and a user experience can be improved.

Figure 8:
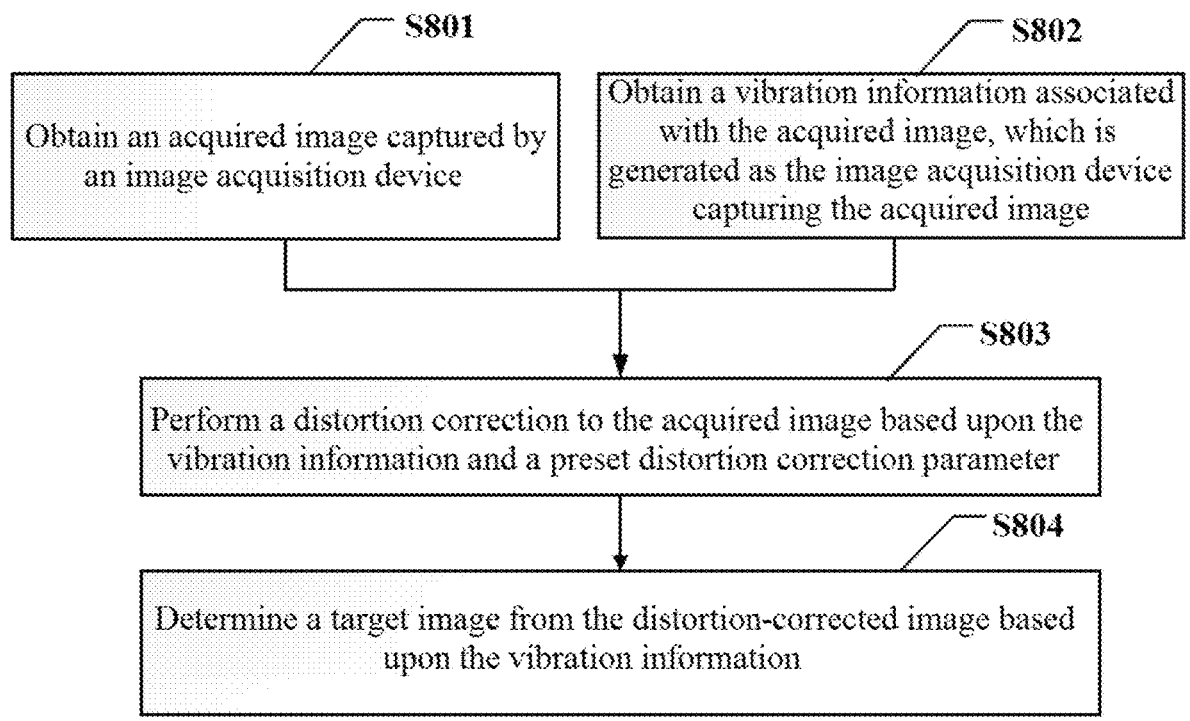
FIG. 8 shows a flowchart of a method of image processing in accordance with another embodiment of the disclosure.

FIG. 8 shows a flowchart of a method of image processing in accordance with another embodiment of the disclosure. The method of image processing in accordance with embodiments of the disclosure can be applied to various image acquisition devices, and can be implemented by one or more image processors. In some embodiments, the method can comprise steps S801 to S804.

In step S801, an acquired image captured by an image acquisition device can be obtained.

The image acquisition device can include an intelligent image capturing device capable of capturing images, such as a still camera or a video camera. An acquired image can be obtained from the image acquisition device through a data communication therewith. In some instances, the image acquisition device can comprise a wide-angle lens such as a fisheye lens, and the acquired image can be a fisheye image.

In step S802, a vibration information associated with the acquired image, which is generated as the image acquisition device capturing the acquired image, can be obtained. In some instances, the vibration information can comprise an angle of vibration.

In some embodiments, the image acquisition device can operate in a video capture mode or in a continuous capture mode. The vibration information can be an angular change in a position of the image acquisition device in capturing a current image relative to a position of the image acquisition device in capturing a previous image. Alternatively, the vibration information can be an angular change in a position of the image acquisition device in capturing a current image relative to a reference position. The reference position can be an initial position of the image acquisition device where it starts to capture images. In some instances, the vibration information can include angular change information of the image acquisition device in three directions. For instance, the vibration information can comprise angular change information in a pitch angle, a yaw angle and a roll angle.

In some instances, an angular sensor (e.g., a gyroscope) can be provided at the image acquisition device to detect the vibration information of the image acquisition device. A raw data can be obtained directly from the angular sensor, and the angular change can be calculated from the raw data. Optionally, the angular change can be obtained directly from the angular sensor provided that the angular sensor is provided with a calculation capability.

In some instances, the angular sensor can be directly provided on the image acquisition device through a fixed connection. Alternatively, the angular sensor can be fixedly connected to various external devices to which the image acquisition device is rigidly connected. For instance, the angular sensor can be mounted on an aerial vehicle which carries the image acquisition device. The angular sensor fixed connected to the external device can detect the vibration information of the image acquisition device as a vibration of the external devices directly leads to a vibration of the image acquisition device. It will be appreciated that, the angular sensor may not accurately detect the vibration information of the image acquisition device if the image acquisition device is flexibly connected to the external device. In this situation, the angular sensor may not be provided on the external device.

In step S803, a distortion correction can be performed to the acquired image based upon the vibration information and a preset distortion correction parameter.

In step S804, a target image can be determined from the distortion-corrected image based upon the vibration information.

In some instances, the target image determined from the distortion-corrected image can be a portion of the distortion-corrected image.

In some instances, the step S804 can comprise determining an initial region from the distortion-corrected image, performing a vibration compensation to the initial region based upon the vibration information to determine a target region, and obtaining the target image corresponding to the target region. In some instances, determining the initial region from the distortion-corrected image can comprise determining the initial region from the distortion-corrected image based upon a preset angle of view.

Optionally, the step S804 can comprise determining an image from the distortion-corrected image as the target image based upon the vibration information and a preset angle of view, the image having an area defined by a preset angle of view.

Figure 9:
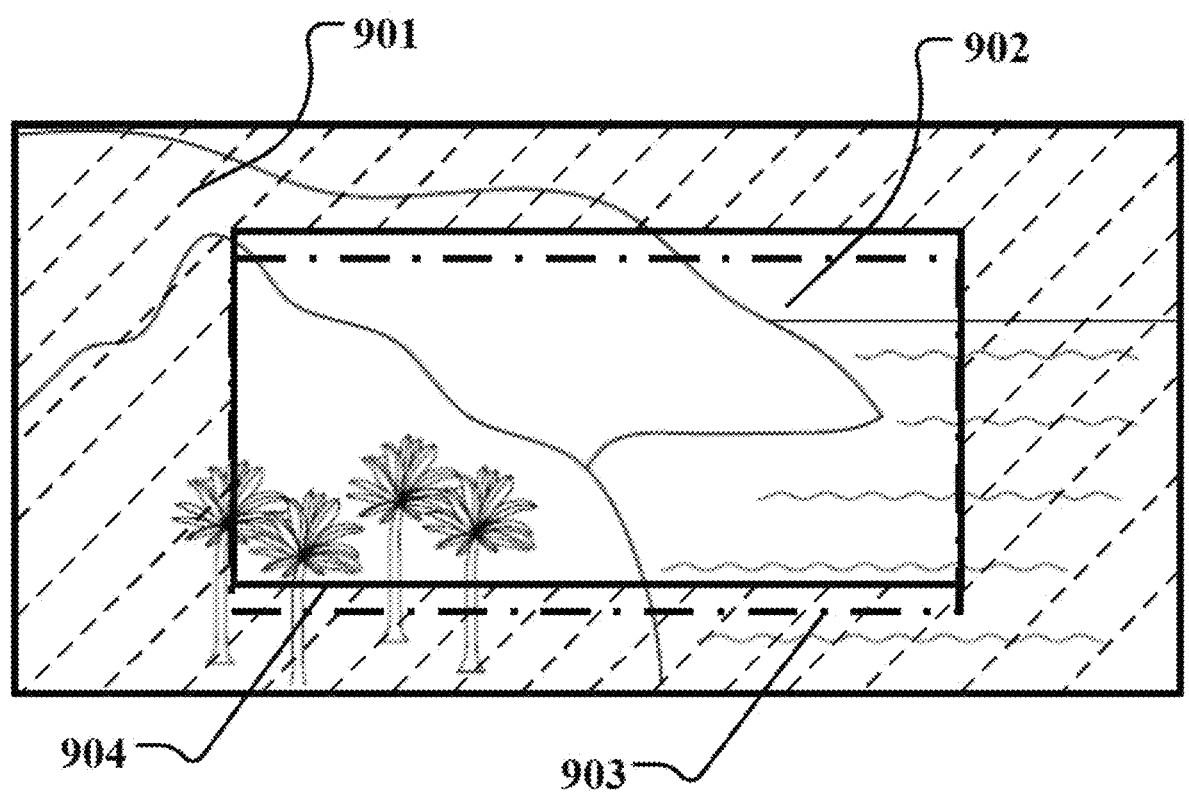
FIG. 9 shows a between a distortion-corrected image and a target image in accordance with embodiments of the disclosure.

In some embodiments of the disclosure, as shown in FIG. 9, a distortion-corrected image 901 can have a first angle of view, while the target image can be a partial image cropped from the distortion-corrected image 901 in accordance with a preset angle of view (e.g., a second angle of view). The partial image can be obtained through a vibration compensation based upon the vibration information, whereas a shaded portion in the distortion-corrected image does not appear in the finally output target image. As shown in FIG. 9, in some embodiments of the disclosure, an image within a dashed box can be obtained if the image acquisition device is rotated downwardly by an angle and no vibration compensation is performed, where the image having the angle of view of the target image. On the contrary, a target image within a solid box can be obtained by moving the dashed box upwardly in the distortion-corrected image if a vibration compensation is performed based upon the rotated angle.

A mapping from a plane coordinate system in which the acquired image is positioned to a target coordinate system can be obtained through a coordinate transformation based upon the vibration information, and subsequently, a texture mapping can be obtained by determining a texture information of respect pixel in the acquired image (e.g., a grayscale value corresponding to the respective pixel). A conversion from the acquired image to an initial image can be effected based upon the coordinate mapping, the texture mapping and a preset distortion correction parameter, such that a distortion-corrected image can be obtained.

Then, the vibration compensation can be performed based upon the vibration information and the preset angle of view, such that a vibration-compensated target image can be obtained from the distortion-corrected image.

In some instances, the vibration compensation can comprise determining an initial region in the distortion-corrected image based upon the preset angle of view, and performing the vibration compensation to the initial region based upon the vibration information to obtain a target region. An image covered by the target region can be the target image. In embodiments of the disclosure, the preset angle of view can be smaller than an angle of view of the image acquisition device in capturing the acquired image. In some instances, the preset angle of view can be an angle of view corresponding to a standard image, while the acquired image can correspond to an angle of view of a fisheye image. Optionally, the acquired image can correspond to a standard angle of view, while the preset angle of view can be smaller than the standard angle of view.

For instance, in performing the compensation, if a pitch angle information in the vibration information indicates that the image acquisition device rotates downwardly by a first angle, then the initial region can be moved upwardly by the first angle. For instance, in performing the compensation, if a yaw angle information in the vibration information indicates that the image acquisition device rotates to the left by a second angle, then the initial region can be moved to the right by the second angle. In this way, the vibration compensation can be effected.

In some instances, the method can further comprise, after the vibration information is detected, detecting an angle of the vibration. The step S803 can be performed if each one of the pitch angle, yaw angle and roll angle in the angle of vibration is less than a preset threshold angle. Otherwise, the step S801 or S802 can be continuously performed without performing the step S803 if one or more of the pitch angle, yaw angle and roll angle in the angle of vibration exceed the preset threshold angle, which indicating that a user intentionally moves the image acquisition device to capture images.

In some instances, the method can further comprise, before performing the distortion correction to the acquired image based upon the vibration information and the preset distortion correction parameter, performing a synchronization to the obtained acquired image and the vibration information to ensure that the obtained vibration and the obtained acquired image are associated with each other, and determine the target image from the acquired image based upon the vibration information once the synchronization is successful.

A detailed description of performing the synchronization to the acquired image and the vibration information is provided in embodiments as discussed hereinabove with reference to FIGS. 2 to 7.

In some embodiments, the process of performing a distortion correction to the acquired image based upon the vibration information and the preset distortion correction parameter can comprises determining a mapping from an image coordinate system in which the acquired image is positioned to a target coordinate system based upon the angle of vibration, and performing the distortion correction to the acquired image to obtain the distortion-corrected image based upon the determined mapping from the image coordinate system in which the acquired image is positioned to the target coordinate system and the preset distortion correction parameter.

In some embodiments, the process of determining a mapping from the image coordinate system in which the acquired image is positioned to a target coordinate system based upon the angle of vibration can comprise establishing a mapping from the image coordinate system in which the acquired image is positioned to a world coordinate system based upon the angle of vibration, determining a mapping from the target coordinate system to the world coordinate system based upon the angle of vibration, and determining the mapping from the image coordinate system in which the acquired image is positioned to the target coordinate system based upon the world coordinate system.

In some embodiments, determining a mapping from the target coordinate system to the world coordinate system based upon the angle of vibration can comprise establishing a mapping from the world coordinate system to a preset tangent plane coordinate system based upon the angle of vibration, establishing a mapping from the target coordinate system to the preset tangent plane coordinate system based upon the angle of vibration, and determining the mapping from the target coordinate system to the world coordinate system based upon the preset tangent plane coordinate system.

In some instances, the tangent plane coordinate system can be a tangent plane coordinate system in which an arbitrary point on a hemispherical surface is positioned, the hemispherical surface having a center coinciding with a center of a lens of the image acquisition device.

In some embodiments, the process of performing a distortion correction to the acquired image to obtain the distortion-corrected image based upon the determined mapping from the image coordinate system in which the acquired image is positioned to the target coordinate system and the preset distortion correction parameter can comprise: mapping each point in the acquired image to a corresponding location in the target coordinate system based upon the determined mapping from the image coordinate system in which the acquired image is positioned to the target coordinate system and the distortion correction parameter, obtaining a pixel value of each point in the acquired image, and generating the distortion-corrected image based upon the obtained pixel value and the location of each point.

A detailed description of the coordinate mapping and the distortion correction is provided in embodiments as discussed hereinabove with reference to FIGS. 2 to 7.

In embodiments of the disclosure, an image processing can be performed based upon a vibration information. An anti-vibration can be effected in the process of image processing without using an anti-vibration hardware device (e.g., a gimbal). A cost can be reduced, and a user experience can be improved.

An device of image processing and a camera in accordance with embodiments of the disclosure will be described.

Figure 10:
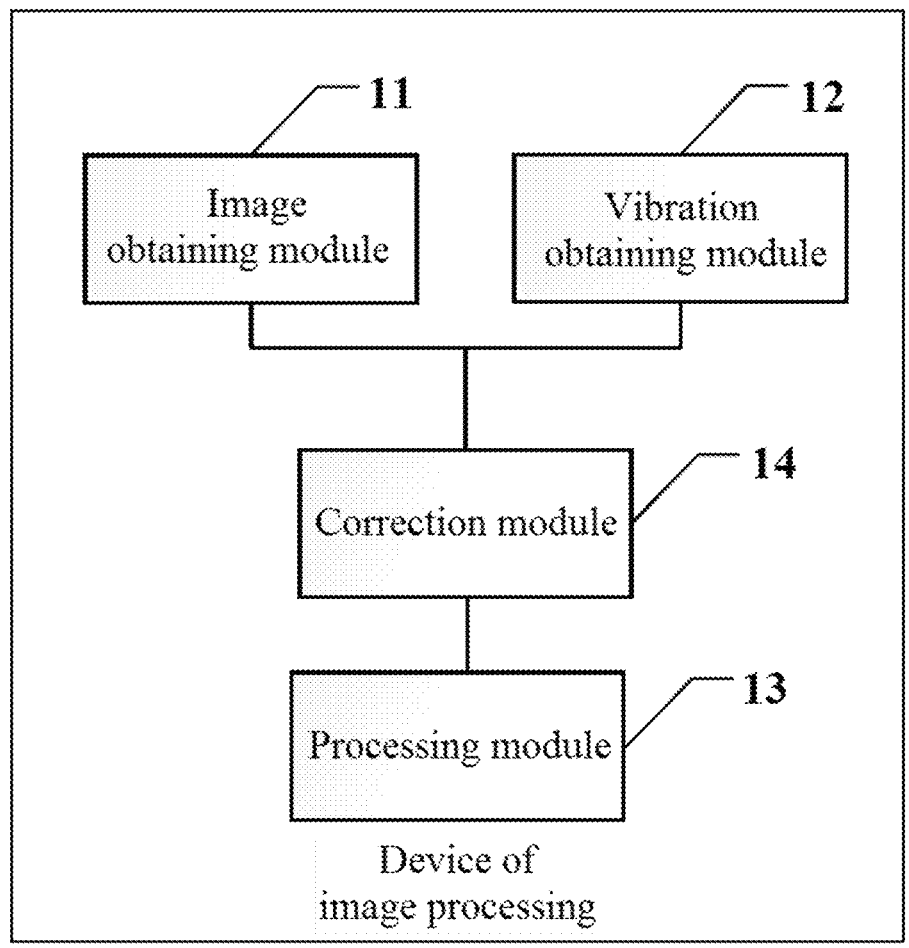
FIG. 10 shows a configuration of a device of image processing in accordance with embodiments of the disclosure.

FIG. 10 shows a configuration of an device of image processing in accordance with embodiments of the disclosure. The device of image processing in accordance with embodiments of the disclosure can be provided in various cameras. Optionally, the device of image processing can be used as a standalone device. In some embodiments, the device of image processing can comprise an image obtaining module 11, a vibration obtaining module 12 and a processing module 13. The image obtaining module 11 can be configured to obtain an acquired image captured by an image acquisition device. The vibration obtaining module 12 can be configured to obtain a vibration information associated with the acquired image, which is generated as the image acquisition device capturing the acquired image. In some instances, the vibration information can comprise an angle of vibration. The processing module 13 can be configured to determine a target image from the acquired image based upon the vibration information.

The image acquisition device can be any intelligent image capturing device capable of capturing images (e.g., a still camera or a video camera) in data communication with the image processing device. The image obtaining module 11 can obtain the acquired image from the image acquisition device once in data communication with the image acquisition device. In some instances, the image acquisition device can comprise a wide-angle lens such as a fisheye lens, and the acquired image acquired can be a fisheye image.

In some embodiments, the vibration information obtained by the vibration obtaining module 12 can be an angular change in a position of the image acquisition device in capturing the acquired image relative to a position of the image acquisition device in capturing a previously acquired image. The angle of vibration can comprise a pitch angle, a yaw angle and/or a roll angle. Alternatively, the vibration information can be an angular change in a position of the image acquisition device in capturing the acquired image relative to a reference position.

In some embodiments, the image acquisition device can operate in a video capture mode or in a continuous capture mode. The vibration information can be an angular change in a position of the image acquisition device in capturing a current image relative to a position of the image acquisition device in capturing a previous image. Alternatively, the vibration information can be an angular change in a position of the image acquisition device in capturing a current image relative to a reference position. The reference position can be an initial position of the image acquisition device where it starts to capture images. In some instances, the vibration information can include an angle information of the image acquisition device in three directions. For instance, the vibration information can comprise a pitch angle, a yaw angle and a roll angle.

In some instances, the vibration obtaining module 12 can obtain the vibration information of the image acquisition device using an angular sensor (e.g., a gyroscope) provided in the image acquisition device. The vibration obtaining module 12 can obtain a raw data directly from the angular sensor, and subsequently calculate the angle information. Optionally, the vibration obtaining module 12 can obtain the angle information directly from the angular sensor provided that the angular sensor is provided with a calculation capability.

In some embodiments, the angular sensor can be directly provided on the image acquisition device through a fixed connection. Alternatively, the angular sensor can be fixedly connected to various external devices to which the image acquisition device is rigidly connected. For instance, the angular sensor can be mounted on an aerial vehicle which carries the image acquisition device. The angular sensor fixed connected to the external device can detect the vibration information of the image acquisition device as a vibration of the external devices directly leads to a vibration of the image acquisition device. It will be appreciated that, the angular sensor may not accurately detect the vibration information of the image acquisition device if the image acquisition device is flexibly connected to the external device. In this situation, the angular sensor may not be provided on the external device.

In some instances, the target image can be an image obtained by the processing module 13 through a coordinate transformation and a distortion correction based upon the vibration information. Optionally, the target image can be a partial image cropped from an image based upon the vibration information, which image is processed through a coordinate transformation and a distortion correction.

In some embodiments, the device in accordance with embodiments of the disclosure can further comprise a correction module 14. The correction module 14 can be configured to perform a synchronization to the obtained acquired image and the vibration information, and provide a trigger information to the processing module once the synchronization is successful.

The acquired image and the vibration information can be aligned with each other in a timeline through the time correction performed by the correction module 14 to the data obtained by the image obtaining module 11 and the vibration obtaining module 12.

Figure 11:
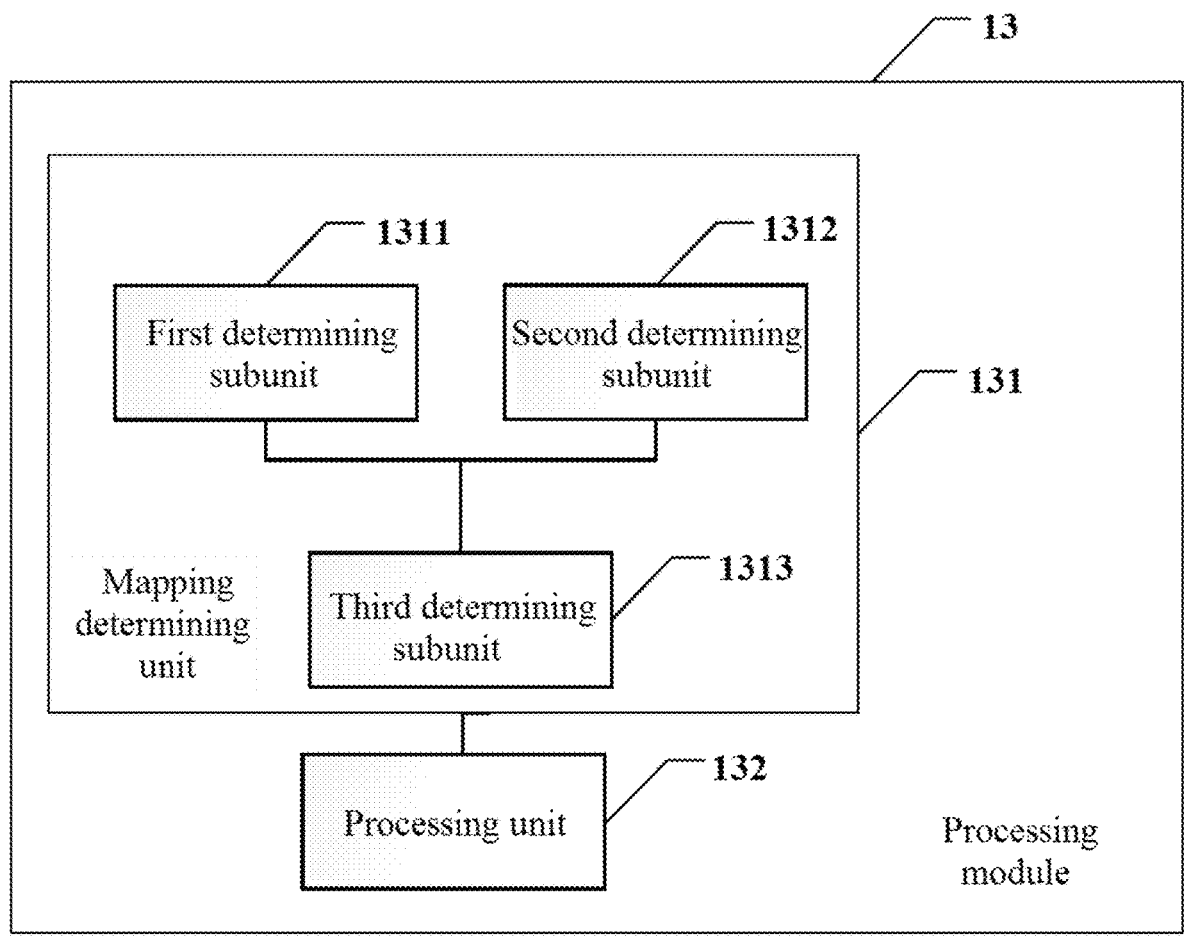
FIG. 11 shows a configuration of a processing module in the device of image processing of FIG. 10.

In some embodiments, as shown in FIG. 11, the processing module 13 can comprise a mapping determining unit 131 and a processing unit 132. The mapping determining unit 131 can be configured to determine a mapping from an image coordinate system in which the acquired image is positioned to a target coordinate system based upon the angle of vibration. The processing unit 132 can be configured to determine the target image from the acquired image based upon the determined mapping from the image coordinate system in which the acquired image is positioned to the target coordinate system.

In some embodiments, the mapping determining unit 131 can comprise a first determining subunit 1311, a second determining subunit 1312 and a third determining subunit 1313. The first determining subunit 1311 can be configured to establish a mapping from the image coordinate system in which the acquired image is positioned to a world coordinate system based upon the angle of vibration. The second determining subunit 1312 can be configured to determine a mapping from the target coordinate system to the world coordinate system based upon the angle of vibration. The third determining subunit 1313 can be configured to determine the mapping from the image coordinate system in which the acquired image is positioned to the target coordinate system based upon the world coordinate system.

In some embodiments, the second determining subunit 1312 can be configured to establish a mapping from the world coordinate system to a preset tangent plane coordinate system based upon the angle of vibration, establish a mapping from the target coordinate system to the preset tangent plane coordinate system based upon the angle of vibration, and determine the mapping from the target coordinate system to the world coordinate system based upon the preset tangent plane coordinate system.

In some instances, the tangent plane coordinate system can be a tangent plane coordinate system in which an arbitrary point on a hemispherical surface is positioned, the hemispherical surface having a center coinciding with a center of a lens of the image acquisition device.

In some embodiments, the processing unit 132 can be configured to obtain a preset distortion correction parameter, map each point in the acquired image to a corresponding location in the target coordinate system based upon the determined mapping from the image coordinate system in which the acquired image is positioned to the target coordinate system and the distortion correction parameter, obtain a pixel value of each point in the acquired image, and generate the target image based upon the obtained pixel value and the location of each point.

In some embodiments, the device of image processing in accordance with embodiments of the disclosure can be provided in a processor. The processor can be a part of an aerial vehicle for aerial photography. The aerial vehicle for aerial photography can comprise a body, the image acquisition device and the processor which includes the device of image processing in accordance with embodiments of the disclosure. The image acquisition device can be mounted on the body of the aerial vehicle. The processor can be in data communication with the image acquisition device.

A detailed description of the modules, units and subunits in the device of image processing is provided in method embodiments as discussed hereinabove with reference to FIGS. 1 to 8.

In embodiments of the disclosure, an image processing can be performed based upon a vibration information. An anti-vibration can be effected in the process of image processing without using an anti-vibration hardware device (e.g., a gimbal). A cost can be reduced, and a user experience can be improved.

Figure 12:
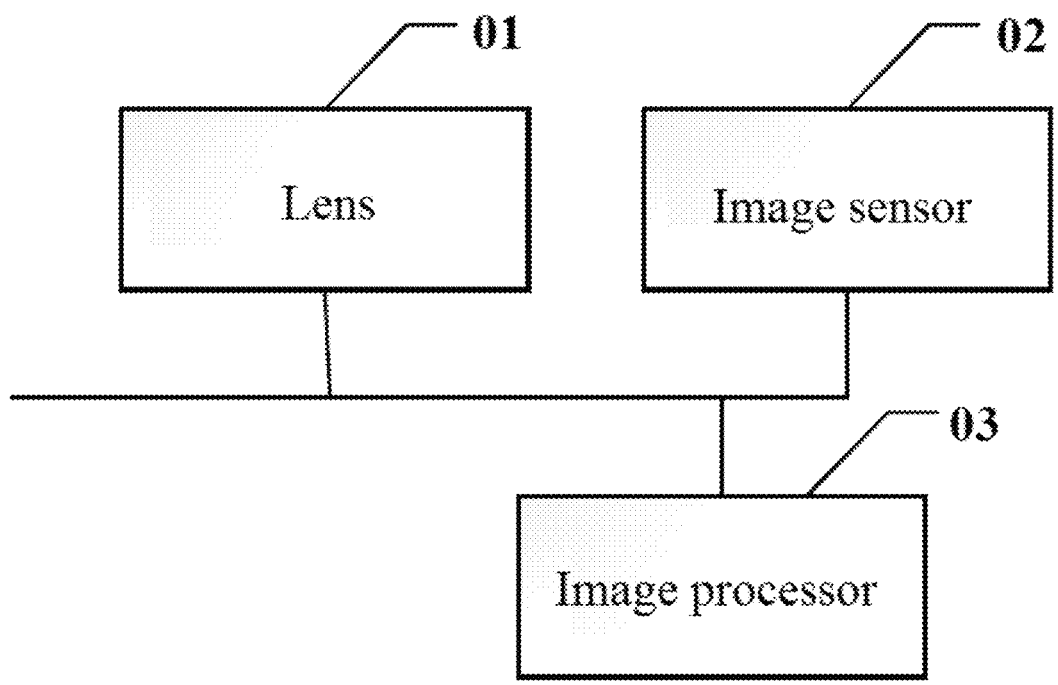
FIG. 12 shows a configuration of a camera in accordance with embodiments of the disclosure.

FIG. 12 shows a configuration of a camera as an example of the image acquisition device in accordance with embodiments of the disclosure. The camera in accordance with embodiments of the disclosure can comprise a lens 01, an image sensor 02 and an image processor 03. The image sensor 02 can be configured to acquire an image data through the lens 01. The image processor 03 can be connected to the image sensor 02 and configured to obtain an acquired image from the image data acquired by the image sensor 02, obtain a vibration information associated with the acquired image, which vibration information is generated as the image acquisition device capturing the acquired image, and determine a target image from the acquired image based upon the vibration information. In some instances, the vibration information can comprise an angle of vibration.

In some instances, the vibration information can be an angular change in a position of the image acquisition device in capturing the acquired image relative to a position of the image acquisition device in capturing a previously acquired image. The angle of vibration can comprise a pitch angle, a yaw angle and/or a roll angle. Optionally, the vibration information can be an angular change in a position of the image acquisition device in capturing the acquired image relative to a reference position.

In some embodiments, the image processor 03 can be configured to perform a synchronization to the obtained captured image and the vibration information, and determine the target image from the acquired image based upon the vibration information once the synchronization is successful.

In some embodiments, the lens 01 can be a fisheye lens 01, and the acquired image can be a fisheye image.

In some embodiments, the image processor 03 can be configured to determine a mapping from an image coordinate system in which the acquired image is positioned to a target coordinate system based upon the angle of vibration, and determine the target image from the acquired image based upon the determined mapping from the image coordinate system in which the acquired image is positioned to the target coordinate system.

In some embodiments, the image processor 03 can be configured to establish a mapping from the image coordinate system in which the acquired image is positioned to a world coordinate system based upon the angle of vibration, determine a mapping from the target coordinate system to the world coordinate system based upon the angle of vibration, and determine a mapping from the image coordinate system in which the acquired image is positioned to the target coordinate system based upon the world coordinate system.

In some embodiments, the image processor 03 can be configured to establish a mapping from the world coordinate system to a preset tangent plane coordinate system based upon the angle of vibration, establish a mapping from the target coordinate system to the preset tangent plane coordinate system based upon the angle of vibration, and determine a mapping from the target coordinate system to the world coordinate system based upon the preset tangent plane coordinate system.

In some instances, the tangent plane coordinate system can be a tangent plane coordinate system in which an arbitrary point on a hemispherical surface having a center coinciding with a center of a lens of the image acquisition device is positioned.

In some embodiments, the image processor 03 can be configured to obtain a preset distortion correction parameter, map each point in the acquired image to a corresponding location in the target coordinate system based upon the determined mapping from the image coordinate system in which the acquired image is positioned to the target coordinate system and the distortion correction parameter, obtain a pixel value of each point in the acquired image, and generate the target image based upon the obtained pixel value and the location of each point.

The camera in accordance with embodiments of the disclosure can be a part of an aerial vehicle for aerial photography. The aerial vehicle for aerial photography can comprise a body and the camera. The camera can be mounted on the body of the aerial vehicle.

A detailed description of components of the camera is provided in method embodiments as discussed hereinabove with reference to FIGS. 1 to 8.

In embodiments of the disclosure, an image processing can be performed based upon a vibration information. An anti-vibration can be effected in the process of image processing without using an anti-vibration hardware device (e.g., a gimbal). A cost can be reduced, and a user experience can be improved.

Figure 13:
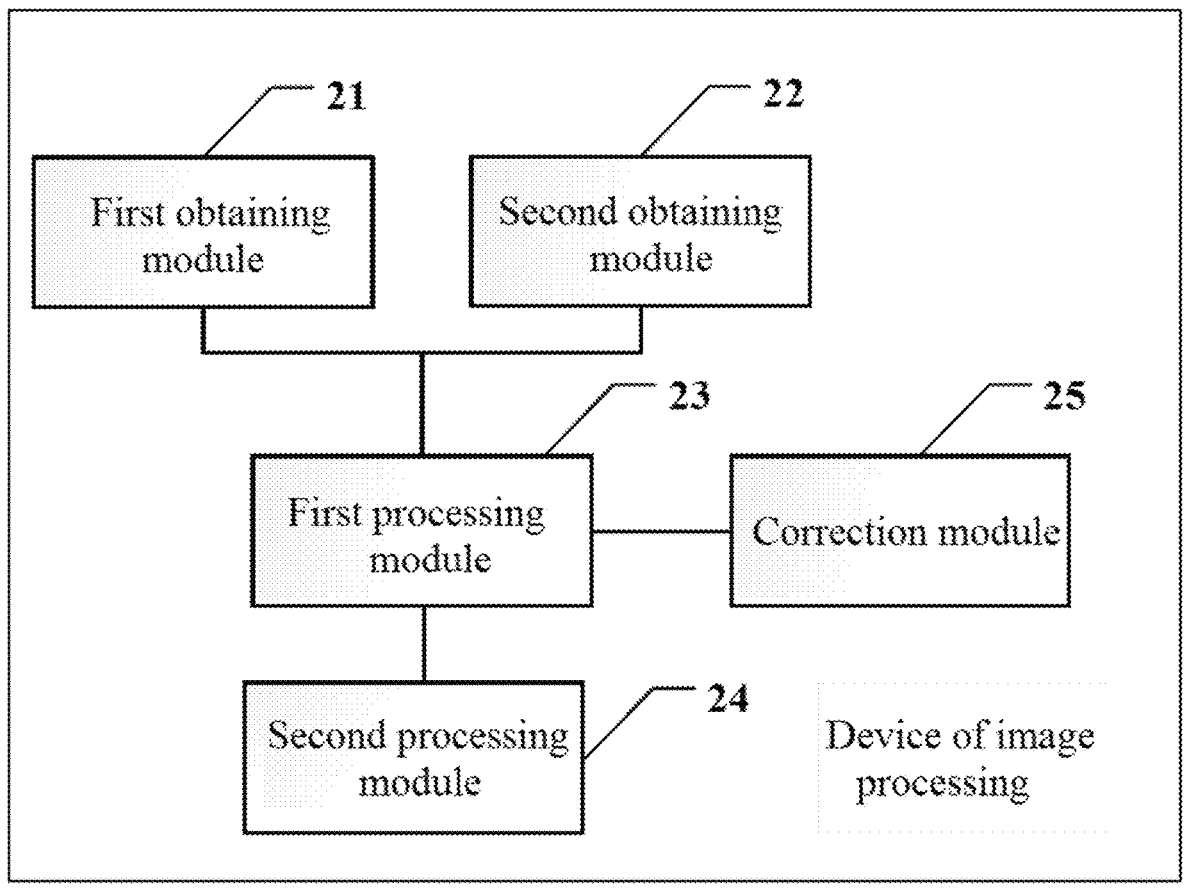
FIG. 13 shows a configuration of a device of image processing in accordance with another embodiment of the disclosure.

FIG. 13 shows a configuration of a device of image processing in accordance with another embodiment of the disclosure. In some instances, the device of image processing in accordance with the embodiments of the disclosure can be provided in various cameras. Optionally, the device of image processing can be used as a standalone device. The device in accordance with embodiments of the disclosure can comprise a first obtaining module 21, a second obtaining module 22, a first processing module 23 and a second processing module 24.

The first obtaining module 21 can be configured to obtain an acquired image captured by an image acquisition device. The second obtaining module 22 can be configured to obtain a vibration information associated with the acquired image, which vibration information is generated as the image acquisition device capturing the acquired image. In some instances, the vibration information can comprise an angle of vibration. The first processing module 23 can be configured to perform a distortion correction to the acquired image based upon the vibration information and a preset distortion correction parameter. The second processing module 24 can be configured to determine a target image from the distortion-corrected image based upon the vibration information.

In some embodiments, the target image determined by the second processing module 24 can be a part of the distortion-corrected image.

In some embodiments, the second processing module 24 can be configured to determine an initial region from the distortion-corrected image, perform a vibration compensation to the initial region based upon the vibration information to determine a target region, and obtain the target image corresponding to the target region.

In some embodiments, the second processing module 24 can be configured to determine the initial region from the distortion-corrected image based upon a preset angle of view.

In some embodiments, the second processing module 24 can be configured to determine an image from the distortion-corrected image as the target image based upon the vibration information and the preset angle of view, the image having an area defined by the preset angle of view.

The image acquisition device can be any intelligent image capturing device capable of capturing images (e.g., a still camera or a video camera). The first obtaining module 21 can obtain the acquired image from the image acquisition device through a data communication with the external image acquisition device. In some instances, the image acquisition device can comprise a wide-angle lens, such as a fisheye lens, and the acquired image can be a fisheye image.

In some embodiments, the image acquisition device can operate in a video capture mode or in a continuous capture mode. The vibration information obtained by the second obtaining module 22 can be an angular change in a position of the image acquisition device in capturing a current image relative to a position of the image acquisition device in capturing a previous image. Alternatively, the vibration information can be an angular change in a position of the image acquisition device in capturing a current image relative to a reference position. The reference position can be an initial position of the image acquisition device where it starts to capture images. In some instances, the vibration information can include an angle information of the image acquisition device in three directions. For instance, the vibration information can comprise a pitch angle, a yaw angle and a roll angle.

In some embodiments, the second obtaining module 22 can obtain the vibration information of the image acquisition device through an angular sensor (e.g., a gyroscope) provided in the image acquisition device. The second obtaining module 22 can obtain a raw data directly from the angular sensor, and subsequently calculate the angle information. Optionally, the second obtaining module 22 can obtain the angle information directly from the angular sensor provided that the angular sensor is provided with a calculation capability.

In some embodiments, the angular sensor can be directly provided on the image acquisition device through a fixed connection. Alternatively, the angular sensor can be fixedly connected to various external devices to which the image acquisition device is rigidly connected. For instance, the angular sensor can be mounted on an aerial vehicle which carries the image acquisition device. The angular sensor fixed connected to the external device can detect the vibration information of the image acquisition device as a vibration of the external devices directly leads to a vibration of the image acquisition device. It will be appreciated that, the angular sensor may not accurately detect the vibration information of the image acquisition device if the image acquisition device is flexibly connected to the external device. In this situation, the angular sensor may not be provided on the external device.

In some embodiments, the second processing module 24 can be configured to determine the initial region from the distortion-corrected image based upon the preset angle of view.

The first processing module 23 can obtain a mapping from a plane coordinate system in which the acquired image is positioned to a target coordinate system through a coordinate transformation based upon the vibration information, and subsequently obtain a texture mapping by determining a texture information of respective pixel in the acquired image (e.g., a grayscale value corresponding to the respective pixel). A conversion from the acquired image to an initial image can be effected based upon the coordinate mapping, the texture mapping and a preset distortion correction parameter, such that a distortion-corrected image can be obtained.

The second processing module 24 can then perform the vibration compensation based upon the vibration information and the preset angle of view, such that a vibration-compensated target image can be obtained from the distortion-corrected image.

In some instances, the vibration compensation can comprise determining an initial region in the distortion-corrected image based upon the preset angle of view, and performing the vibration compensation to the initial region based upon the vibration information to obtain a target region. An image covered by the target region can be the target image. In embodiments of the disclosure, the preset angle of view can be smaller than an angle of view of the image acquisition device in capturing the acquired image. In some instances, the preset angle of view can be an angle of view corresponding to a standard image, while the acquired image can correspond to an angle of view of a fisheye image. Optionally, the acquired image can correspond to a standard angle of view, while the preset angle of view can be smaller than the standard angle of view.

For instances, in performing the compensation, if a pitch angle information in the vibration information indicates that the image acquisition device rotates downwardly by a first angle, then the second processing module 24 can reversely move the initial region upwardly by the first angle. For instance, if a yaw angle information in the vibration information indicates that the image acquisition device rotates to the left by a second angle, then the second processing module 24 can reversely move the initial region to the right by the second angle. In this way, the vibration compensation can be effected.

In some embodiments, the device can further comprise a detection judging module configured to detect an angle of the vibration after the vibration information is detected. The detection judging module can be configured to send a trigger information to the first processing module 23 to perform the distortion correction if each one of the pitch angle, yaw angle and roll angle in the angle of vibration is less than a preset threshold angle. Otherwise, if one or more of the pitch angle, yaw angle and roll angle in the angle of vibration exceed the preset threshold angle, which indicating that a user intentionally moves the image acquisition device to capture images, the distortion correction and the processing performed to the target image may not be required and subsequent operations of the first processing module 23 and the second processing module 24 can be stopped, or the detection judging module can send a trigger information to the first obtaining module 21 and the second obtaining module 22 to obtain relevant data.

In some embodiments, the second processing module 24 can be configured to determine an initial region from the distortion-corrected image based upon the preset angle of view.

In some instances, the vibration information can be an angular change in a position of the image acquisition device in capturing the acquired image relative to a position of the image acquisition device in capturing a previously acquired image. The angle of vibration can comprise a pitch angle, a yaw angle and/or a roll angle.

In some embodiments, the device of image processing in accordance with embodiments of the disclosure can further comprise a correction module 25. The correction module 25 can be configured to perform a synchronization to the obtained acquired image and the vibration information, and send a trigger information to the first processing module 23 once the synchronization is successful.

The correction module 25 can perform a correction to the data obtained by the first obtaining module 21 and the second obtaining module 22, such that the acquired image and the vibration information can be aligned with each other in a timeline, ensuring that the vibration information is an information on the angular change in the position of the image acquisition device at a time the acquired image is captured.

Figure 14:
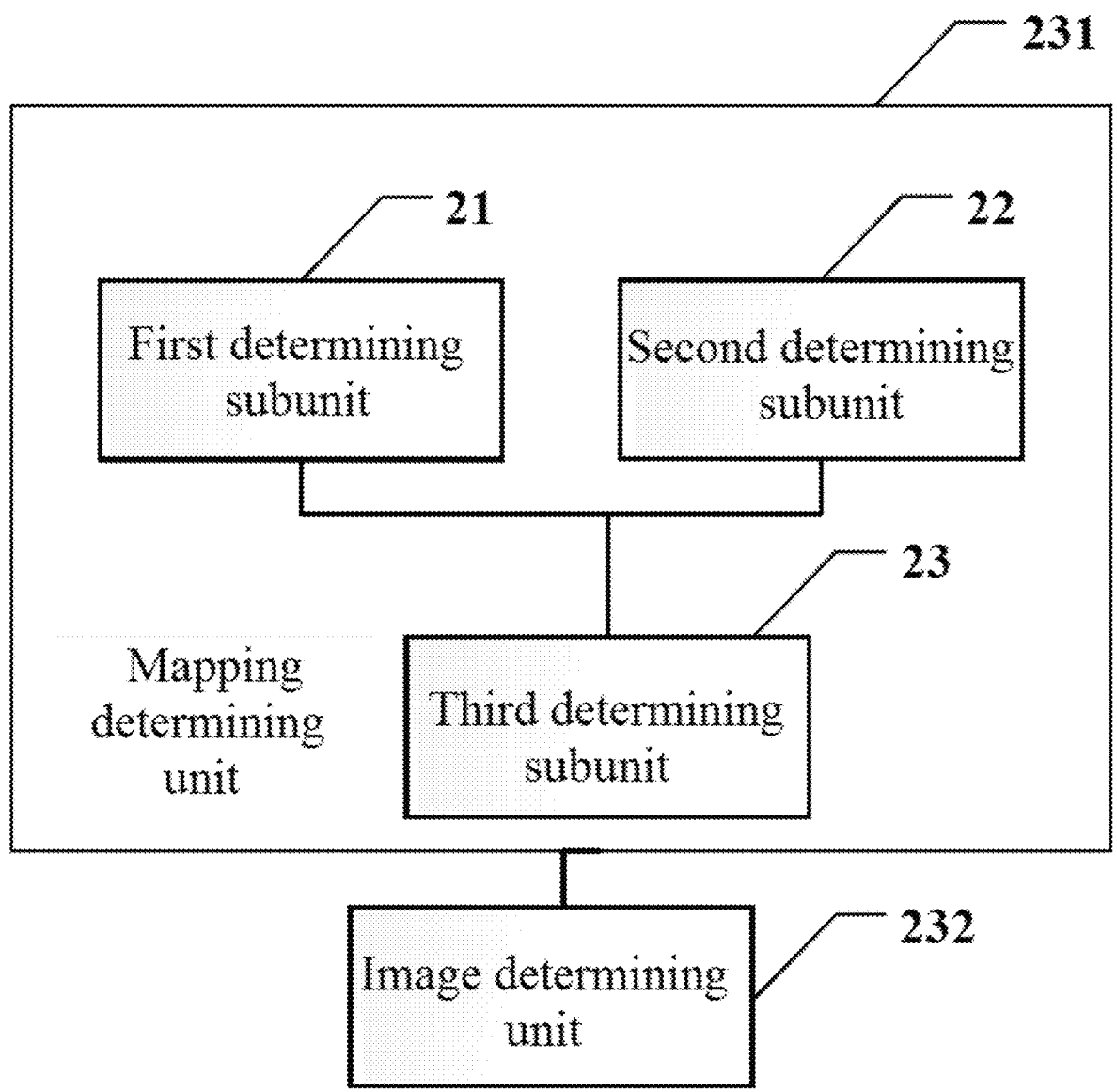
FIG. 14 shows a configuration of a first processing module in the device of image processing of FIG. 13.

In some embodiments, as shown in FIG. 14, the first processing module 23 can comprise a mapping determining unit 231 and an image determining unit 232. The mapping determining unit 231 can be configured to determine a mapping from an image coordinate system in which the acquired image is positioned to a target coordinate system based upon the angle of vibration. The image determining unit 232 can be configured to perform the distortion correction to the acquired image to obtain the distortion-corrected image based upon the determined mapping from the image coordinate system in which the acquired image is positioned to the target coordinate system and the preset distortion correction parameter.

In some embodiments, the mapping determining unit 231 can comprise a first determining subunit 2311, a second determining subunit 2312 and a third determining subunit 2313. The first determining subunit 2311 can be configured to establish a mapping from the image coordinate system in which the acquired image is positioned to a world coordinate system based upon the angle of vibration. The second determining subunit 2312 can be configured to determine a mapping from the target coordinate system to the world coordinate system based upon the angle of vibration. The third determining subunit 2313 can be configured to determine a mapping from the image coordinate system in which the acquired image is positioned to the target coordinate system based upon the world coordinate system.

In some embodiments, the second determining subunit 2312 can be configured to establish a mapping from the world coordinate system to a preset tangent plane coordinate system based upon the angle of vibration, establish a mapping from the target coordinate system to the preset tangent plane coordinate system based upon the angle of vibration, and determine a mapping from the target coordinate system to the world coordinate system based upon the preset tangent plane coordinate system.

In some instances, the tangent plane coordinate system can be a tangent plane coordinate system in which an arbitrary point on a hemispherical surface is positioned, the hemispherical surface having a center coinciding with a center of a lens of the image acquisition device.

In some embodiments, the image determining unit 232 can be configured to map each point in the acquired image to a corresponding location in the target coordinate system based upon the determined mapping from the image coordinate system in which the acquired image is positioned to the target coordinate system and the distortion correction parameter, obtain a pixel value of each point in the acquired image, and generate the distortion-corrected image based upon the obtained pixel value and the location of each point.

The device of image processing in accordance with embodiments of the disclosure can be provided in a processor. The processor can be a part of an aerial vehicle for aerial photography. The aerial vehicle for aerial photography can comprise a body, the image acquisition device and the processor which includes the device of image processing in accordance with embodiments of the disclosure. The image acquisition device can be mounted on the body of the aerial vehicle. The processor can be in data communication with the image acquisition device.

A detailed description of the modules, units and subunits in the device of image processing is provided in method embodiments as discussed hereinabove with reference to FIGS. 1 to 8.

In embodiments of the disclosure, an image processing can be performed based upon a vibration information. An anti-vibration can be effected in the process of image processing without using an anti-vibration hardware device (e.g., a gimbal). A cost can be reduced, and a user experience can be improved.

Figure 15:
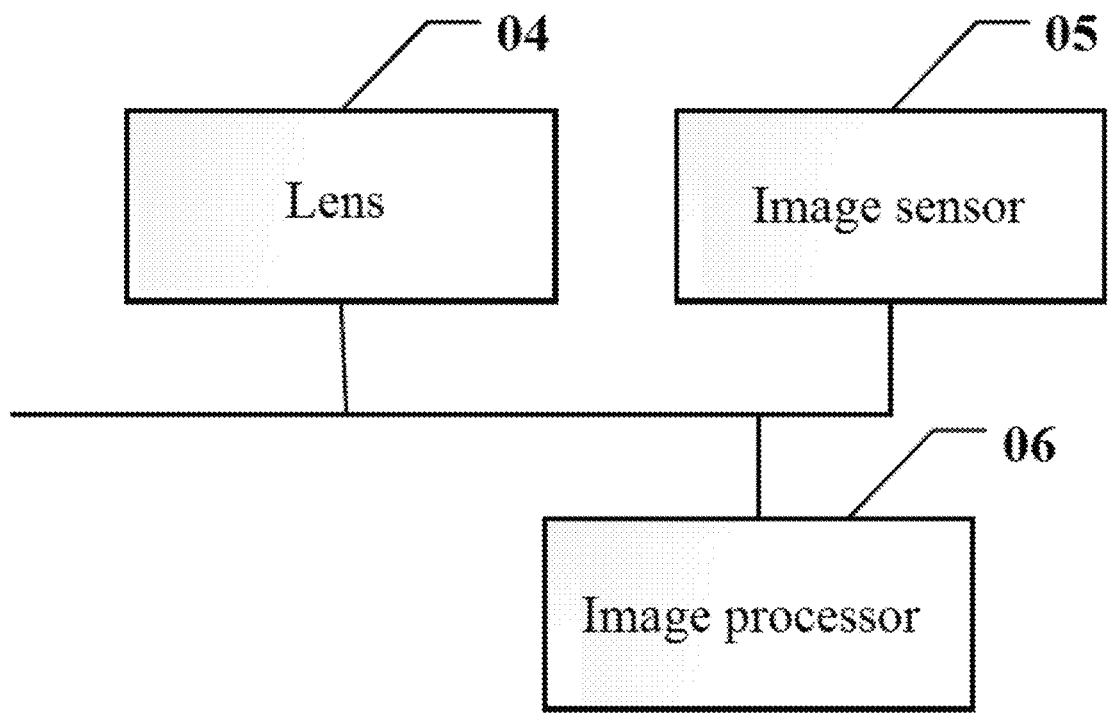
FIG. 15 shows a configuration of a camera in accordance with embodiments of the disclosure.

FIG. 15 shows a configuration of a camera as an example image acquisition device in accordance with embodiments of the disclosure. The camera in accordance with embodiments of the disclosure can comprise a lens 04, an image sensor 05 and an image processor 06. The image sensor 05 can be configured to acquire an image data through the lens 04. The image processor 06 can be connected to the image sensor 05. The image processor 06 can be configured to: obtain an acquired image from the image data acquired by the image sensor 05; obtain a vibration information associated with the acquired image, which vibration information is generated as the image acquisition device capturing the acquired image, which vibration information comprising an angle of vibration; perform a distortion correction to the acquired image based upon the vibration information and a preset distortion correction parameter; and determine a target image from the distortion-corrected image based upon the vibration information.

In some instances, the target image determine by the image processor 06 can be a part of the distortion-corrected image.

In some instances, the image processor 06 can be configured to determine an initial region from the distortion-corrected image, perform a vibration compensation to the initial region based upon the vibration information to determine a target region, and obtain the target image corresponding to the target region.

In some instances, the image processor 06 can be configured to determine the initial region from the distortion-corrected image based upon a preset angle of view.

In some instances, the image processor 06 can be configured to determine an image from the distortion-corrected image as the target image based upon the vibration information and the preset angle of view, the image having an area defined by the preset angle of view.

In some instances, the image processor 06 can be configured to determine the initial region from the distortion-corrected image based upon the preset angle of view.

In some instances, the vibration information can be an angular change in a position of the image acquisition device in capturing the acquired image relative to a position of the image acquisition device in capturing a previously acquired image. Optionally, the vibration information can be an angular change in a position of the image acquisition device in capturing the acquired image relative to a reference position. The angle of vibration can comprise a pitch angle, a yaw angle and/or a roll angle.

In some instances, the image processor 06 can be further configured to perform a synchronization to the obtained acquired image and the vibration information, and determine the target image from the acquired image based upon the vibration information once the synchronization is successful.

In some instances, the lens 04 can be a fisheye lens, and the acquired image can be a fisheye image.

In some instances, the image processor 06 can be configured to determine a mapping from an image coordinate system in which the acquired image is positioned to a target coordinate system based upon the angle of vibration, and perform the distortion correction to the acquired image to obtain the distortion-corrected image based upon the determined mapping from the image coordinate system in which the acquired image is positioned to the target coordinate system and the preset distortion correction parameter.

In some instances, the image processor 06 can be configured to establish a mapping from the image coordinate system in which the acquired image is positioned to a world coordinate system based upon the angle of vibration, determine a mapping from the target coordinate system to the world coordinate system based upon the angle of vibration, and determine a mapping from the image coordinate system in which the acquired image is positioned to the target coordinate system based upon the world coordinate system.

In some instances, the image processor 06 is configured to establish a mapping from the world coordinate system to a preset tangent plane coordinate system based upon the angle of vibration, establish a mapping from the target coordinate system to the preset tangent plane coordinate system based upon the angle of vibration, and determine a mapping from the target coordinate system to the world coordinate system based upon the preset tangent plane coordinate system.

In some instances, the tangent plane coordinate system can be a tangent plane coordinate system in which an arbitrary point on a hemispherical surface is positioned, the hemispherical surface having a center coinciding with a center of a lens of the image acquisition device.

In some instances, the image processor 06 can be configured to map each point in the acquired image to a corresponding location in the target coordinate system based upon the determined mapping from the image coordinate system in which the acquired image is positioned to the target coordinate system and the distortion correction parameter, obtain a pixel value of each point in the acquired image, and generate the distortion-corrected image based upon the obtained pixel value and the location of each point.

The camera in accordance with embodiments of the disclosure can be a part of an aerial vehicle for aerial photography. The aerial vehicle for aerial photography can comprise a body and the camera. The camera can be mounted on the body of the aerial vehicle.

A detailed description of the components of the camera is provided in method embodiments as discussed hereinabove with reference to FIGS. 1 to 8.

In embodiments of the disclosure, an image processing can be performed based upon a vibration information. An anti-vibration can be effected in the process of image processing without using an anti-vibration hardware device (e.g., a gimbal). A cost can be reduced, and a user experience can be improved.

It will be appreciated that, the device and method disclosed in embodiments of the disclosure can be implemented in other manners. For instance, the described device embodiments are merely illustrative. For instance, a division of modules or units is merely a division based upon a logical function. Various divisions can be possible in actual implementation. For instance, multiple units or components can be combined or integrated on another system. For instance, some features can be ignored or not be performed. For instance, a mutual coupling, a direct coupling or a communication connection as shown or discussed can be an indirect coupling or a communication connection via an interface, a means or a unit. The coupling can be an electrical coupling or a mechanical coupling.

The units illustrated as separate parts may or may not be physically separated. The parts shown as units may or may not be physical units. For instance, the parts can be provided at the same location or distributed over a plurality of network units. All or part of the units can be selected to implement the embodiments of the disclosure according to actual requirements.

Various functional units in the embodiments of the disclosure may be integrated in one processing unit. The functional units can be separate and physical units. Two or more units may be integrated in one unit. The integrated units may be implemented as hardware or software functional units.

The integrated units, if implemented as software functional units and sold or used as independent products, may be stored in a computer-readable storage medium. With such an understanding, essentially the technical solution of the disclosure, or a part making contribution over the prior art, or all or part of the technical solution may be embodied as a software product. The computer software product is stored in a storage medium and includes several instructions for causing a computer processor to execute all or part of steps of the method according to the various embodiments of the present disclosure. The above mentioned storage medium includes: various media capable of storing program code, such as a U disk, a removable hard disk, ROM (read-only memory), RAM (random access memory), a diskette, an optical disk, etc.

The above description merely illustrates some embodiments of the disclosure and is not intended to limit the scope of the disclosure. Any equivalent changes in structures or processes made in light of the specification and the drawings, and their direct or indirect application in other related technical fields should all be encompassed in the scope of the present disclosure.

What is claimed is:

1. An image processing method comprising:
   obtaining an acquired image captured by an image acquisition device;
   obtaining vibration information associated with the acquired image and generated while the image acquisition device capturing the acquired image, the vibration information comprising an angular change;
   determining a mapping from an image coordinate system in which the acquired image is positioned to a target coordinate system based upon the angular change;
   performing a distortion correction to the acquired image to obtain the distortion-corrected image based upon the mapping from the image coordinate system to the target coordinate system and the preset distortion correction parameter; and
   determining a target image from the distortion-corrected image based upon the vibration information;
   wherein determining the mapping from the image coordinate system to the target coordinate system based upon the angular change comprises:
   establishing a mapping from the image coordinate system to a world coordinate system based upon the angular change;
   determining a mapping from the target coordinate system to the world coordinate system based upon the angular change; and
   determining the mapping from the image coordinate system to the target coordinate system based upon the world coordinate system;
   wherein determining the mapping from the target coordinate system to the world coordinate system based upon the angular change comprises:
   establishing a mapping from the world coordinate system to a preset tangent plane coordinate system based upon the angular change;

establishing a mapping from the target coordinate system to the preset tangent plane coordinate system based upon the angular change; and determining the mapping from the target coordinate system to the world coordinate system based upon the preset tangent plane coordinate system.

2. The method of claim 1, wherein determining the target image from the distortion-corrected image based upon the vibration information comprises:

determining an initial region from the distortion-corrected image, performing a vibration compensation to the initial region based upon the vibration information to determine a target region, and obtaining the target image corresponding to the target region.

3. The method of claim 2, wherein determining the initial region from the distortion-corrected image comprises:

determining the initial region from the distortion-corrected image based upon a preset angle of view.

4. The method of claim 1, wherein determining the target image from the distortion-corrected image based upon the vibration information comprises:

determining an image from the distortion-corrected image as the target image based upon the vibration information and a preset angle of view, the image corresponding to an area defined by the angle of view.

5. The method of claim 1, wherein:

the angular change includes a change of the position of the image acquisition device in capturing the acquired image relative to the position of the image acquisition device in capturing a previously acquired image or relative to a reference position, and the angular change comprises at least one of a pitch angle, a yaw angle, or a roll angle.

6. The method of claim 1, further comprising, before performing the distortion correction to the acquired image based upon the vibration information and the preset distortion correction parameter:

performing a synchronization to the acquired image and the vibration information.

7. The method of claim 1, wherein the acquired image includes a fisheye image.

8. The method of claim 1, wherein performing the distortion correction to the acquired image to obtain the distortion-corrected image based upon the mapping from the image coordinate system to the target coordinate system and the preset distortion correction parameter comprises:

mapping a plurality of points in the acquired image to corresponding locations in the target coordinate system based upon the determined mapping from the image coordinate system to the target coordinate system and the distortion correction parameter;

obtaining pixel values of the points in the acquired image; and generating the distortion-corrected image based upon the pixel values and the locations of the points in the target coordinate system.

9. An image processing device comprising:
a processor; and
a memory storing instructions that, when executed by the processor, cause the processor to:
obtain an acquired image captured by an image acquisition device;
obtain vibration information associated with the acquired image and generated while the image acquisition device capturing the acquired image, the vibration information comprising an angular change;

establish a mapping from an image coordinate system in which the acquired image is positioned to a world coordinate system based upon the angular change;

determine a mapping from a target coordinate system to the world coordinate system based upon the angular change;

establish a mapping from the world coordinate system to a preset tangent plane coordinate system based upon the angular change;

establish a mapping from the target coordinate system to the preset tangent plane coordinate system based upon the angular change;

determine a mapping from the target coordinate system to the world coordinate system based upon the preset tangent plane coordinate system;

determine a mapping from the image coordinate system to the target coordinate system based upon the world coordinate system;

perform a distortion correction to the acquired image to obtain the distortion-corrected image based upon the mapping from the image coordinate system to the target coordinate system and the preset distortion correction parameter; and determine a target image from the distortion-corrected image based upon the vibration information.

10. The device of claim 9, wherein the instructions further cause the processor to:

determine an initial region from the distortion-corrected image;

perform a vibration compensation to the initial region based upon the vibration information to determine a target region; and obtain the target image corresponding to the target region.

11. The device of claim 10, wherein the instructions further cause the processor to:

determine the initial region from the distortion-corrected image based upon a preset angle of view.

12. The device of claim 9, wherein the instructions further cause the processor to:

determine an image from the distortion-corrected image as the target image based upon the vibration information and a preset angle of view, the image corresponding to an area defined by the angle of view.

13. The device of claim 9, wherein:

the angular change includes a change of the position of the image acquisition device in capturing the acquired image relative to the position of the image acquisition device in capturing a previously acquired image or relative to a reference position, and the angular change comprises at least one of a pitch angle, a yaw angle, or a roll angle.

14. The device of claim 9, wherein the instructions further cause the processor to, before performing the distortion correction to the acquired image based upon the vibration information and the preset distortion correction parameter:

perform a synchronization to the acquired image and the vibration information.

15. The device of claim 9, wherein the instructions further cause the processor to:

map a plurality of points in the acquired image to corresponding locations in the target coordinate system based upon the determined mapping from the image coordinate system to the target coordinate system and the distortion correction parameter;

obtain pixel values of the points in the acquired image; and generate the distortion-corrected image based upon the pixel values and the locations of the points in the target coordinate system.

16. An aerial vehicle comprising:

a body;

an image acquisition device mounted on the body; and an image processing device of claim 9 in data communication with the image acquisition device.

* * * * *